United States Patent
Lee et al.

(10) Patent No.: US 9,379,574 B2
(45) Date of Patent: Jun. 28, 2016

(54) METHOD AND APPARATUS FOR CONTROLLING ABNORMAL CONDITION IN WIRELESS POWER RECEIVER

(71) Applicant: Samsung Electronics Co., Ltd., Gyeonggi-do (KR)

(72) Inventors: Ho-Seong Lee, Gyeonggi-do (KR); Kang-Ho Byun, Gyeonggi-do (KR); Kyung-Woo Lee, Seoul (KR); Yu-Su Kim, Gyeonggi-do (KR); Yun-Jeong Noh, Busan (KR); Se-ho Park, Gyeonggi-do (KR); Min-Cheol Ha, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 235 days.

(21) Appl. No.: 14/269,514

(22) Filed: May 5, 2014

(65) Prior Publication Data

US 2014/0327393 A1 Nov. 6, 2014

(30) Foreign Application Priority Data

May 3, 2013 (KR) ........................ 10-2013-0050333

(51) Int. Cl.
| | |
|---|---|
| *H01M 10/44* | (2006.01) |
| *H01M 10/46* | (2006.01) |
| *H02J 7/02* | (2016.01) |
| *H02J 5/00* | (2016.01) |
| *H02J 17/00* | (2006.01) |

(52) U.S. Cl.
CPC ................. *H02J 7/025* (2013.01); *H02J 5/005* (2013.01); *H02J 17/00* (2013.01)

(58) Field of Classification Search
CPC ......... H02J 5/005; H02J 7/025; H02J 7/0091; H02J 7/047
USPC .................... 320/108, 114, 150, 153
See application file for complete search history.

(56) References Cited

U.S. PATENT DOCUMENTS

| | | | |
|---|---|---|---|
| 2009/0262468 A1 | 10/2009 | Ide et al. | |
| 2012/0119914 A1 | 5/2012 | Uchida | |
| 2012/0126747 A1* | 5/2012 | Kiko | ..................... B60L 3/0069 320/109 |
| 2012/0223590 A1 | 9/2012 | Low et al. | |
| 2012/0306433 A1 | 12/2012 | Kim et al. | |

(Continued)

FOREIGN PATENT DOCUMENTS

| | | |
|---|---|---|
| KR | 1020120134030 | 12/2012 |
| KR | 1020130114473 | 10/2013 |

(Continued)

*Primary Examiner* — Edward Tso
(74) *Attorney, Agent, or Firm* — The Farrell Law Firm, P.C.

(57) ABSTRACT

A method for controlling an abnormal state of a wireless Power Receiving Unit (PRU) is provided. The method includes measuring a temperature by a period shorter than a previous measurement period when a temperature measured by the wireless PRU in response to a transmission of power from a wireless Power Transmitting Unit (PTU) is higher than a temperature required to be monitored; determining whether the measured temperature is higher than a temperature at which a load switch connected to a charging unit is turned off if the measured temperature is equal to or higher than the temperature required to be monitored; and turning off the load switch if the measured temperature is higher than the temperature at which the load switch is turned off.

19 Claims, 19 Drawing Sheets

(56) References Cited

U.S. PATENT DOCUMENTS

2013/0093254 A1  4/2013  Urano
2013/0264997 A1  10/2013  Lee et al.

FOREIGN PATENT DOCUMENTS

KR  1020140087526  7/2014
WO  WO 2011/010375  1/2011

\* cited by examiner

METHOD AND APPARATUS FOR CONTROLLING ABNORMAL CONDITION IN WIRELESS POWER RECEIVER

PRIORITY

This application claims priority under 35 U.S.C. §119(a) to Korean Patent Application Serial No. 10-2013-0050333, which was filed in the Korean Intellectual Property Office May 3, 2013, the entire content of which is incorporated herein by reference.

BACKGROUND OF INVENTION

1. Field of the Invention

The present invention relates generally to a wireless charging network, and more particularly, to a method and apparatus for controlling an abnormal status of a wireless power receiver such as over-temperature, overvoltage, overcurrent, and the like.

2. Description of the Related Art

A mobile terminal such as a portable phone, a Personal Digital Assistant (PDA), and the like is driven with rechargeable batteries due to their nature, and the battery of the mobile terminal is charged through supplied electric energy by using a separate charging device. Typically, the charging device and the battery have separate contact terminals at an exterior thereof, respectively, and are electrically connected with each other by contacting the contact terminals.

However, since the contact terminal protrudes outwardly in such a contact type charging scheme, the contact terminal is easily contaminated by foreign substances and thus the battery charging may not be correctly performed. Further, the battery charging may also not be correctly performed in a case where the contact terminal is exposed to moisture.

Recently, a wireless charging or a non-contact charging technology has been developed and is used for electronic devices to solve the above-mentioned problem.

Such a wireless charging technology employs wireless electric power transmission/reception, and corresponds to, for example, a system in which a battery can be automatically charged when a portable phone is not connected to a separate charging connector but merely placed on a charging pad.

Wireless electric toothbrushes or a wireless electric shavers use wireless charging technology. Accordingly, a waterproof function can be improved since electronic products are wirelessly charged through the wireless charging technology, and the portability of electronic devices can be increased since there is no need to provide a wired charging device. Technologies related to the wireless charging technology are expected to be significantly developed in the coming age of electric cars.

The wireless charging technology largely includes an electromagnetic induction scheme using a coil, a resonance scheme using a resonance, and an RF/microwave radiation scheme converting electrical energy to a microwave and then transmitting the microwave.

Up to now the electromagnetic induction scheme is mainstream, but it is expected that the day will come when all electronic products are wirelessly charged, anytime and anywhere, without a wire in the near future on the strength of recent successful experiments for wirelessly transmitting power to a destination spaced away by dozens of meters through the use of microwaves at home and abroad.

A power transmission method through the electromagnetic induction corresponds to a scheme of transmitting electric power between a first coil and a second coil. When a magnet is moved in a coil, induction current is generated. By using the induction current, a magnetic field is generated at a transmission side, and electric current is induced according to a change of the magnetic field so as to make energy at a reception side. The phenomenon is referred to as magnetic induction, and the electric power transmission method using magnetic induction has high energy transmission efficiency.

With respect to the resonance scheme, electricity is wirelessly transferred using an electric power transmission principle of the resonance scheme even if a device to be charged is separated from a charging device by several meters. The wireless charging system uses an electromagnetic wave containing electrical energy which resonates instead of making sounds resonate. The resonated electric energy is directly transferred only when there is a device having a resonance frequency and parts of electric energy which are not used are reabsorbed into an electromagnetic field instead of being spread in the air, so that it is considered that the electric energy does not affect surrounding machines or people unlike other electromagnetic waves.

Meanwhile, active research on a wireless charging scheme is currently being progressed, but standards for a wireless charging order, a search for a wireless power transmitter/receiver, selection of a communication frequency between the wireless power transmitter/receiver, a wireless power control, selection of a matching circuit, and communication time distribution to each wireless power receiver in one charging cycle have not been proposed.

Particularly, in the case where the wireless power transmitter charges at least one wireless power receiver, development in technology of charging a new wireless power receiver to be charged has been required.

SUMMARY OF THE INVENTION

The present invention is designed to address at least the problems and/or disadvantages described above and to provide at least the advantages described below.

Accordingly, an aspect of the present invention is to provide a method of controlling an abnormal condition in a wireless power receiver, which is capable of controlling an abnormal status such as over-temperature, overvoltage, overcurrent and the like in the wireless power receiver.

In accordance with an aspect of the present invention, a method of controlling an abnormal state of a wireless Power Receiving Unit (PRU) is provided. The method includes measuring a temperature by a period shorter than a previous measurement period when a temperature measured by the wireless PRU in response to a transmission of power from a wireless Power Transmitting Unit (PTU) is higher than a temperature required to be monitored; determining whether the measured temperature is higher than a temperature at which a load switch connected to a charging unit is turned off if the measured temperature is equal to or higher than the temperature required to be monitored; and turning off the load switch if the measured temperature is higher than the temperature at which the load switch is turned off.

In accordance with another aspect of the present invention, a wireless PRU for controlling an abnormal state is provided. The PRU includes a temperature measurement unit which measures a temperature of the wireless PRU corresponding to a power transmission from a wireless Power Transmitting Unit (PTU). The PRU includes a controller which controls to measure a temperature by a period shorter than a previous measurement period if a measurement temperature is higher than a temperature required to be monitored, to determine whether the measured temperature is higher than a temperature at which a load switch is turned off if the measured temperature is higher than a temperature required to be monitored, and to turn off the load switch if the measured temperature is higher than a temperature at which the load switch is turned off.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE EMBODIMENTS OF THE PRESENT INVENTION

Figure 1:
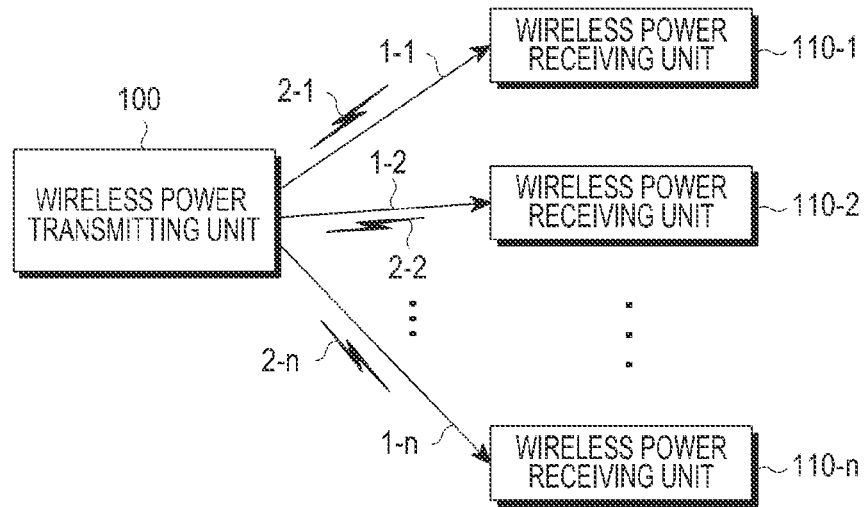
FIG. 1 is a conceptual block diagram illustrating an overall operation of a wireless charging system, according to an embodiment of the present invention.

Hereinafter, various embodiments of the present invention will be described more specifically with reference to the accompanying drawings. It should be noted that the same components of the drawings are designated by the same reference numerals throughout. In the following description of the present invention, a detailed description of known functions and configurations incorporated herein will be omitted when it may make the subject matter of the present invention unclear.

There is an advantage in that the wireless PTU is informed of an occurrence of the abnormal status in the wireless PRU, so as to prevent the abnormal charging state when the abnormal status such as the over-temperature, the overvoltage, the overcurrent and the like is present in the PRU.

According to various embodiments of the present invention, there are provided the wireless PRU and the method of controlling the wireless PRU, which can notify of a change to the wireless PTU when the change in the wireless power transmission environment is detected. In addition, there are provided the wireless PTU and the method of controlling the wireless PTU, which can receive a detection signal for the change in the wireless power transmission environment.

For example, when the power transmission environment is changed such as in a case where a wired charging terminal is inserted into the wireless PRU, transmission of the wireless power is stopped and thus over power is prevented from being applied to the wireless PRU.

Further, when the power transmission environment is changed such as a case where a Stand Alone (SA) mode in which the wireless PRU loads a communication stack from a ROM of a communication unit is converted to a Non Stand Alone (NSA) mode in which the wireless PRU loads the communication stack from an AP, the wireless PTU may standby even though a signal is not received from the wireless PRU.

Further, when the power transmission environment is changed such as a case where an error state of the wireless PRU is released, the wireless PTU may transmit charging power again and thus stably maintain the wireless power transmission environment.

FIG. 1 is a conceptual block diagram illustrating an overall operation of a wireless charging system. As shown in FIG. 1, the wireless charging system includes a wireless power transmitting unit PTU 100 and one or more wireless Power Receiving Units (PRU) 110-1, 110-2, . . . , and 110-*n*.

The wireless PTU 100 wirelessly transmits electric power 1-1, 1-2, . . . , and 1-*n* to the one or more wireless PRU 110-1, 110-2, . . . , and 110-*n*, respectively. Particularly, the wireless PTU 100 wirelessly transmits electric power 1-1, 1-2, ..., and 1-n to only a wireless PRU which is authenticated through a predetermined authentication procedure.

The wireless PTU 100 achieves an electrical connection with the wireless PRUs 110-1, 110-2, ..., and 110-n. For example, the wireless PTU 100 transmits wireless electric power in a form of electromagnetic waves to the wireless power receiving 110-1, 110-2, ..., and 110-n.

The wireless PTU 100 performs bidirectional communication with the wireless PRUs 110-1, 110-2, ..., and 110-n. Here, the wireless PTU 100 and the wireless PRUs 110-1, 110-2, ..., and 110-n process packets 2-1, 2-2, ..., 2-n including a predetermined number of frames, or transmit and receive the packets. The frames will be described below in more detail below. The wireless PRUs 110-1, 110-2, ..., and 110-n may be implemented in a mobile communication terminal, a PDA, a PMP, a smart phone or the like.

The wireless electric PTU 100 wirelessly provides electric power to a plurality of wireless PRUs 110-1, 110-2, ..., and 110-n. For example, the wireless PTU 100 transmits electric power to the plurality of wireless PRUs 110-1, 110-2, ..., and 110-n through a resonant scheme. When the wireless PTU 100 adopts the resonant scheme a distance between the wireless PTU 100 and the plurality of wireless PRUs 110-1, 110-2, ..., and 110-n may be equal to or shorter than 30 m. Further, when the wireless PTU 100 adopts the electromagnetic induction scheme, a distance between the wireless PTU 100 and the plurality of wireless PRUs 110-1, 110-2, ..., and 110-n may be equal to or shorter than 10 cm.

The wireless PRUs 110-1, 110-2, ..., and 110-n receive wireless electric power from the wireless PTU 100 to charge batteries therein. Further, the wireless PRUs 110-1, 110-2, ..., and 110-n transmits a signal of requesting a wireless power transmission, information necessary for a reception of wireless electric power, information on a status of the wireless PRUs, or information on a control of the wireless PTU 100 to the wireless PTU 100. Information on the transmission signal will be described below in more detail below.

Further, the wireless PRUs 110-1, 110-2, ..., and 110-n transmit a message indicating a charging state of each of the wireless PRUs 110-1, 110-2, ..., and 110-n to the wireless PTU 100.

The wireless PTU 100 may include a display means such as a display, and display a state of each of the wireless PRUs 110-1, 110-2, and 110-n based on the message received from each of the wireless PRUs 110-1, 110-2, ..., and 110-n. Further, the wireless PTU 100 may also display a time expected to be spent until each of the wireless PRUs 110-1, 110-2, ..., and 110-n is completely charged.

The wireless PTU 100 transmits a control signal for disabling a wireless charging function to each of the wireless PRUs 110-1, 110-2, ..., and 110-n. The wireless PRUs having received the disable control signal of the wireless charging function from the wireless PTU 100 disable the wireless charging function.

Figure 2:
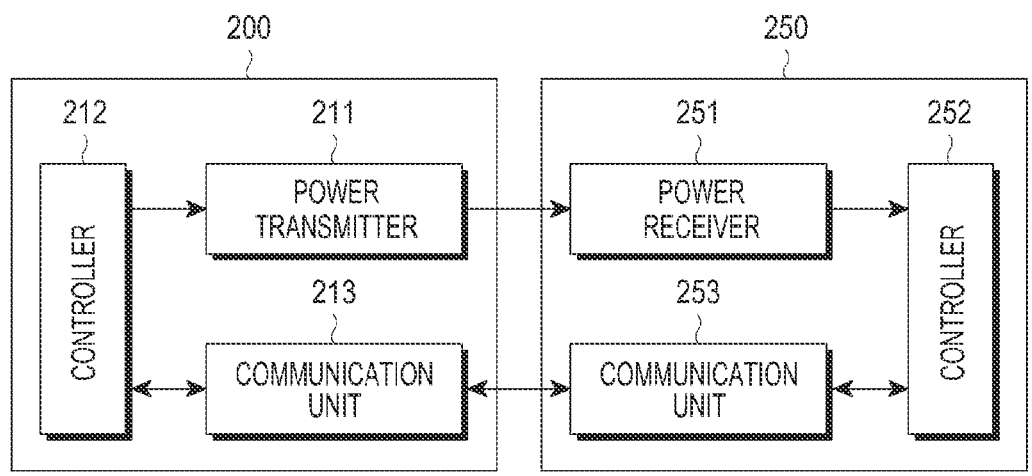
FIG. 2 is a block diagram illustrating a wireless power transmitting unit (PTU) and a wireless PRU, according to an embodiment of the present invention.

FIG. 2 is a block diagram illustrating a wireless PTU 200 and a wireless PRU 250, according to the embodiment of the present invention.

As shown in FIG. 2, a wireless PTU 200 includes a power transmitter 211, a controller 212 and a communication unit 213. Further, a wireless PRU 250 includes a power receiver 251, a controller 252 and a communication unit 253.

The power transmitter 211 supplies power which is required by the wireless PTU 200, and wirelessly provides power to the wireless PRU 250. Here, the power transmitter 211 provides the electric power in a form of alternate current waves, and also supplies electric power in a form of direct current waves. Furthermore, the electric power transmitter 211 converts the direct current waves into the alternate current waves by using an inverter so as to provide the electric power in the form of alternate current waves. The power transmitter 211 may be implemented in a form of an embedded battery or in a form of a power receiving interface so as to receive the electric power from outside thereof to supply the electric power to the other components. It will be easily understood by those skilled in the art that the power transmitter 211 can supply electric power of constant alternate current waves.

In addition, the power transmitter 211 supplies the alternate current waves to the wireless PRU 250 in a form of electromagnetic waves. The electric power transmitter 211 further includes a resonance circuit (not shown), resulting in a transmission or a reception of desired electromagnetic waves. When the power transmitter 211 is implemented by the resonant circuit, inductance L of a loop coil of the resonant circuit may be variable. Meanwhile, it will be easily understood by those skilled in the art that the power transmitter 211 can transmit and receive the electromagnetic waves.

The controller 212 controls an overall operation of the wireless PTU 200. The controller 212 controls an overall operation of the wireless PTU 200 by using an algorithm, a program, or an application which is required for a control and read from a storage unit (not shown). The controller 212 may be implemented in a form of a Central Processing Unit (CPU), a microprocessor, or a mini computer. Operation of the controller 212 will be described below in detail below.

The communication unit 213 communicates with the wireless PRU 250 in a specific manner. The communication unit 213 is capable of communicating with a communication unit 253 of the wireless PRU 250 by using a Near Field Communication (NFC) scheme, a Zigbee communication scheme, an infrared ray communication scheme, a visible ray communication scheme, a Bluetooth communication scheme, a Bluetooth low energy scheme and the like. The communication unit 213 may use a Carrier Sense Multiple Access (CSMA)/Collision Avoidance (CA). On the other hand, the above mentioned communication schemes are merely illustrated, and the scope of the present invention is not limited by a specific communication scheme which is performed by the communication unit 213.

Furthermore, the communication unit 213 transmits a signal for information of the wireless PTU 200. Here, the communication unit 213 may unicast, multicast, or broadcast the signal. Table 1 indicates a data structure of signals transmitted from the wireless PTU 200 according to the embodiment of the present invention. The wireless PTU 200 transmits a signal having the following frame by preset periods, and the signal may be named a notice signal hereinafter.

TABLE 1

| Frame type | Protocol version | Sequence number | Network ID | RX to Report (schedule mask) | Reserved | Number of Rx |
|---|---|---|---|---|---|---|
| Notice | 4 bit | 1 Byte | 1 Byte | 1 Byte | 5 bit | 3 bit |

In Table 1, the frame type is a field indicating a type of a signal, which indicates that a corresponding signal is a notice signal. The protocol version is a field indicating a sort of protocol in a communication scheme, to which 4 bits may be allocated. The sequence number is a field indicating a sequence of a corresponding signal, to which one byte may be allocated. For example, the sequence number may increase by one in correspondence to a step for transmission and reception of a signal. A network ID is a field indicating a network identifier of the wireless PTU 200, for example, to which one byte may be allocated. An Rx to Report (schedule mask) is a field indicating wireless PRUs which perform a report to the wireless PTU 200, for example, to which one byte may be allocated.

Table 2 indicates the Rx to Report (schedule mask) field for the report according to the embodiment of the present invention.

TABLE 2

| Rx to Report(schedule mask) | | | | | | | |
|---|---|---|---|---|---|---|---|
| Rx1 | Rx2 | Rx3 | Rx4 | Rx5 | Rx6 | Rx7 | Rx8 |
| 1 | 0 | 0 | 0 | 0 | 1 | 1 | 1 |

Here, Rx1 to Rx8 corresponds to first to eighth wireless PRUs. The Rx to Report field may be implemented so that a wireless PRU marked by a schedule mask number 1 is allowed to make report.

Referring again to Table 1, a reserved field is a field reserved for being used in the future, to which for example, five bytes may be allocated. A field of Number of Rx is a field indicating the number of wireless PRUs around the wireless PTU 200, to which for example, 3 bits may be allocated.

Further, the communication unit 213 receives power information from the wireless PRU 250. Here, the power information includes at least one of a capacity of the wireless PRU 250, a residual amount of the battery, a number of times of charging, an amount of use, a battery capacity, and a proportion of the battery.

Further, the communication unit 213 transmits a signal of controlling a charging function in order to control the charging function of the wireless PRU 250. The signal of controlling the charging function may be a control signal of controlling the wireless power receiver 251 of the specific wireless PRU 250 so as to make the charging function to be enabled or disabled. Furthermore, the power information, which will be described in detail below, may include information on an insertion of a wireless charging terminal, a transition from an SA mode to an NSA mode, releasing of an error state and the like.

The communication unit 213 receives a signal from another wireless PTU (not shown) as well as the wireless power receiving 250. For example, the communication unit 213 receives a notice signal of the frame in the above mentioned Table 1 from another wireless PTU.

Meanwhile, although it is illustrated that the power transmitter 211 and the communication unit 213 are configured as different hardware so that the wireless PTU 200 communicates in an out-band manner in FIG. 2, this is only an example. In the present invention, the power transmitter 211 and the communication unit 213 are implemented with a piece of hardware so that the wireless PTU 200 performs communication in an in-band manner.

The wireless PTU 200 and the wireless PRU 250 transmit and receive various signals. Accordingly, the wireless PRU 250 enters a wireless power network which is managed by the wireless PTU 200 and performs a charging process through wireless power transmission and reception. The above mentioned process will be described below in more detail below.

Figure 3:
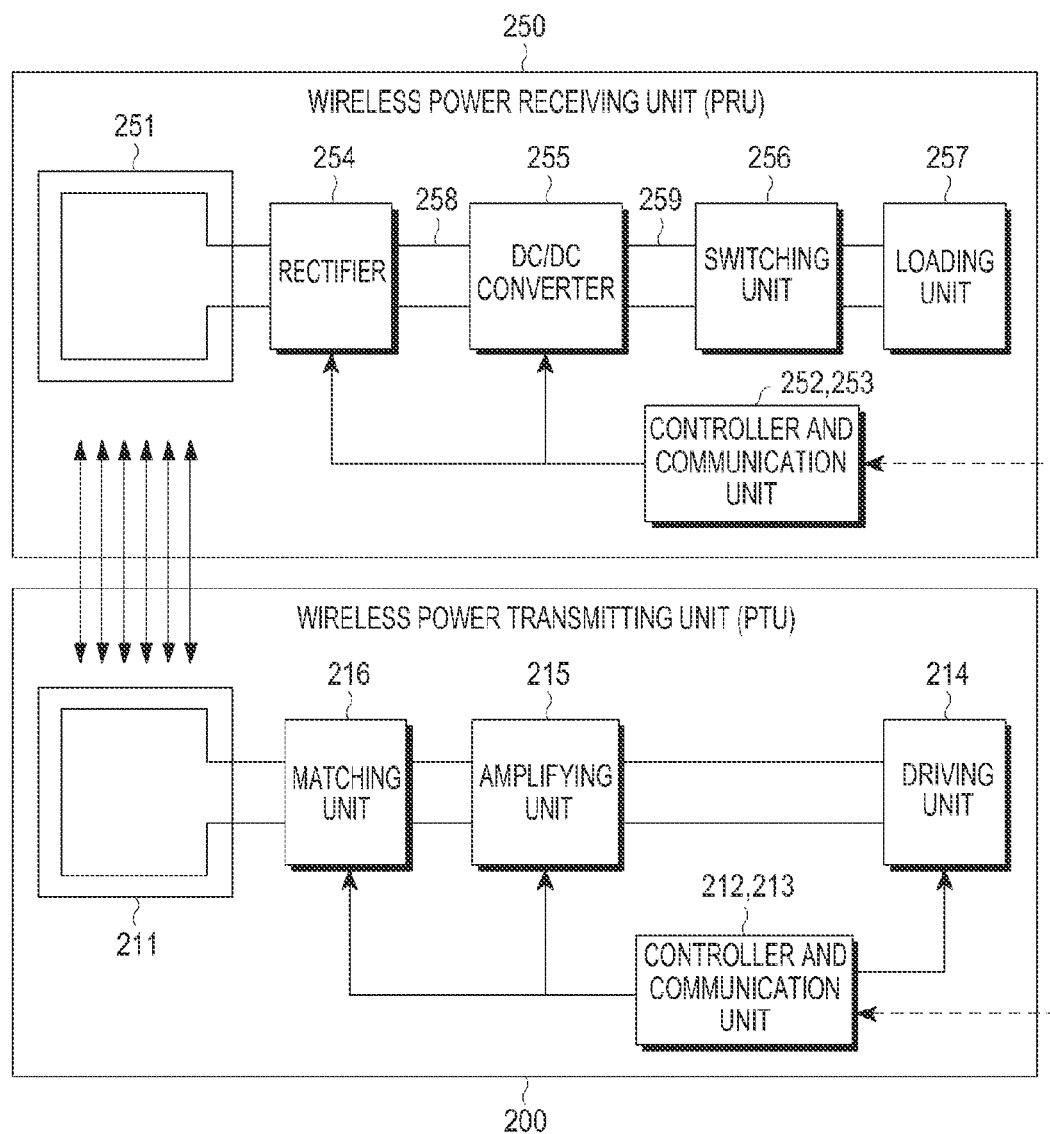
FIG. 3 is a block diagram illustrating a detail of the wireless PTU and the wireless PRU, according to an embodiment of the present invention.

FIG. 3 is a block diagram illustrating a detail of the wireless PTU 200 and the wireless PRU 250 according to the embodiment of the present invention.

As shown in FIG. 3, the wireless PTU 200 includes the power transmitter 211, the controller 212, the communication unit 213, a driving unit 214, an amplifying unit 215, and a matching unit 216. The wireless PRU 250 includes a power receiver 251, a controller 252, a communication unit 253, a rectifier 254, a DC/DC converter 255, a switching unit 256 and a loading unit 257.

The driving unit 214 outputs DC power having a preset voltage value. The voltage value of the DC power output by the driving unit 214 is controlled by the controller 212 and the communication unit 213.

The DC power output from the driving unit 214 is output to the amplifying unit 215. The amplifying unit 215 amplifies the DC power by a preset gain. Further, the amplifying unit 215 converts DC power to AC power based on a signal input from the controller 212 and the communication unit 213. Accordingly, the amplifying unit 215 outputs AC power.

The matching unit 216 performs impedance matching. For example, the matching unit 216 adjusts impedance and controls the output power to have high efficiency or high capacity. The matching unit 216 adjusts impedance under a control of the controller 212 and the communication unit 213. The matching unit 216 may include at least one of a coil and a capacitor. The controller 212 and/or the communication unit 213 control a connection state with at least one of the coil and the capacitor, and accordingly, perform impedance matching.

The power transmitter 211 transmits input AC power to the power receiver 251. The power transmitter 211 and the power receiver 251 may be implemented with a resonance circuit having an identical resonance frequency. For example, the resonance frequency may be determined as 6.78 MHz.

Meanwhile, the controller 212 and the communication unit 213 communicate with the controller 252 and the communication unit 253 of the wireless PRU 250, and perform bi-directional communication, for example, with a frequency of 2.4 GHz.

On the other hand, the power receiver 251 may receive charging power.

The rectifier 254 rectifies wireless power received by the power receiver 251 in the form of direct current, and is implemented in a form of a bridge diode. The DC/DC converter 255 converts the rectified electric current into a predetermined gain. For example, the DC/DC converter 255 converts the rectified electric current so that a voltage of an output end 259 becomes 5V. Meanwhile, a minimum value and a maximum value of the voltage which can be applied to a front end 258 of the DC/DC converter 255 may be preset.

The switch unit 256 connects the DC/DC converter 256 to the load unit 257. The switch unit 256 is held in an on/off state under a control of the controller 252. When the switch unit 256 is in the on state, the load unit 257 stores converted electric power which is input from the DC/DC converter 255.

Figure 4:
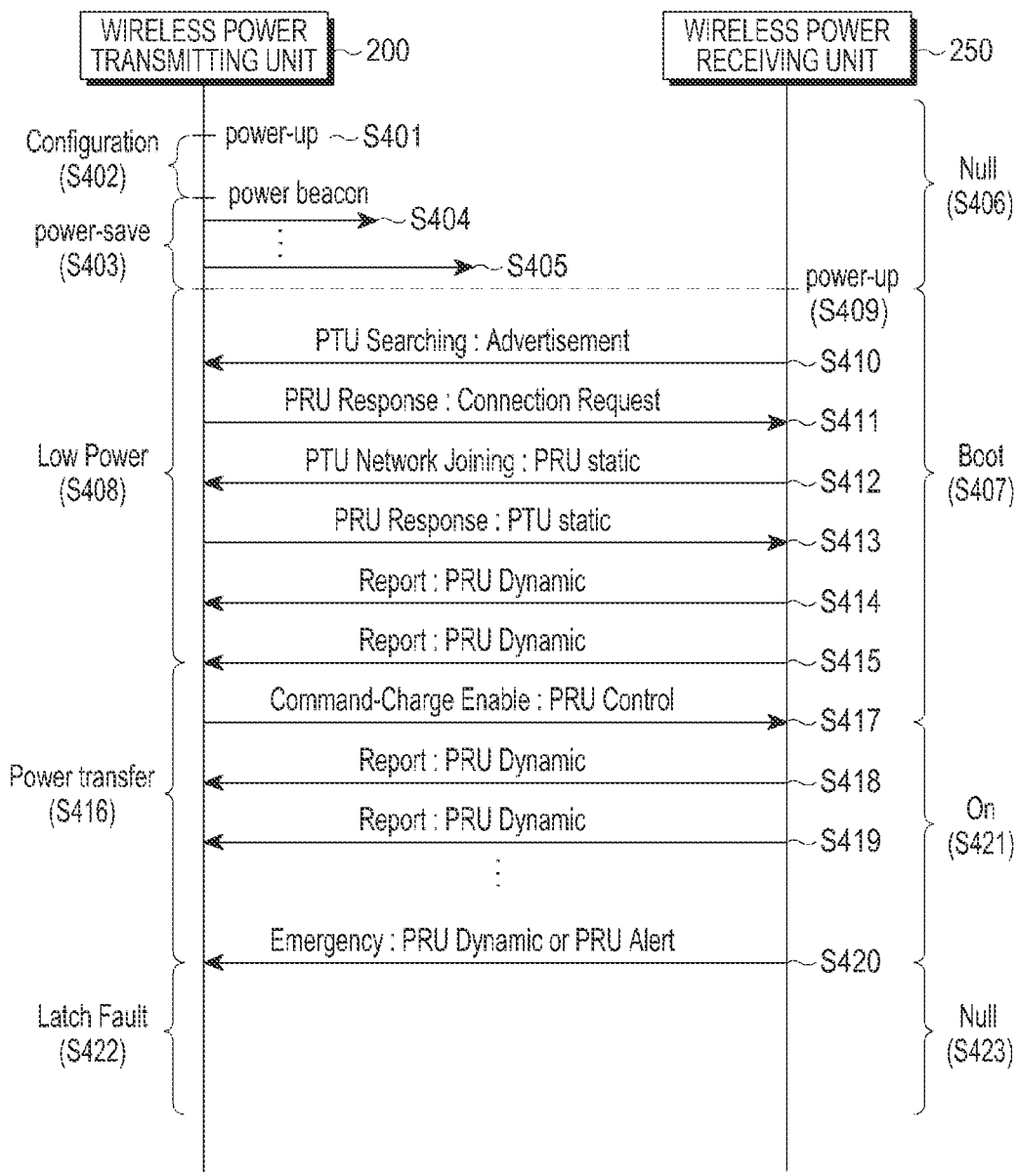
FIG. 4 is a signal flow diagram illustrating operations of the wireless PTU and the wireless PRU, according to the embodiment of the present invention.

FIG. 4 is a signal flow diagram illustrating operations of the wireless PTU 200 and the wireless PRU 250, according to the embodiment of the present invention. As shown in FIG. 4, a wireless PTU 200 applies electric power at step S401. When the electric power is applied, the wireless PTU 200 configures an environment at S402.

The wireless PTU 200 enters a power saving mode at step S403. In the power saving mode, the wireless PTU 200 may apply different types of power beacons for detection by periods, which will be described in more detail with reference to FIG. 6. For example, as shown in FIG. 4, the wireless PTU 200 applies detection power beacons 404 and 405 and magnitudes of power values of the detection power beacons 404 and 405 may be different. A part or all of the detection power beacons 404 and 405 have enough power to drive the communication unit of the wireless power receiver 250. For example, the wireless PRU 250 may drive the communication unit by the part or all of the detection power beacons 404 and 405 to communicate with the wireless PTU 200. The above state may be named a null state.

The wireless PTU 200 detects a load change by an arrangement of the wireless PRU 250. The wireless PTU 200 enters a low power mode in step S408. The low power mode will be described in more detail with reference to FIG. 6. Meanwhile, the wireless PRU 250 drives the communication unit based on power received from the wireless PTU 200 at step S409.

The wireless PRU 250 transmits a PTU searching signal to the wireless PTU 200 at step S410. The wireless PRU 250 transmits the PTU searching signal by using Bluetooth Low Energy (BLE) based advertisement signal. The wireless PRU 250 may transmit the PTU searching signal periodically until a preset time arrives, or may receive a response signal from the wireless PTU 200.

When receiving the PTU searching signal from the wireless PRU 250, the wireless PTU 200 transmits a PRU response signal at step S411. The PRU response signal forms a connection between the wireless PTU 200 and the wireless PRU 250.

The wireless PRU 250 transmits a PRU static signal at step S412. Here, the PRU static signal indicates the state of the wireless PRU 250, and the wireless PTU 200 requests the wireless PRU 250 to enter the wireless electric power network, which the wireless PTU 200 controls, through the PRU static signal.

The wireless PTU 200 transmits the PTU static signal at step S413. The static signal, which the wireless PTU 200 transmits, may be a signal indicating capability of the wireless PTU 200.

When the wireless PTU 200 and the wireless PRU 250 transmit and receive the PRU static signal and the PTU static signal, the wireless PTU 200 transmits a PRU dynamic signal by periods at steps S414 and S415. The PRU dynamic signal includes information on at least one parameter measured by the wireless PRU 250. For example, the PRU dynamic signal may include information on a voltage at a rear end of the rectifier of the wireless PRU 250. The status of the wireless PRU 250 may be referred to as a boot status S427.

The wireless PTU 200 enters a power transmission mode at step S416, and the wireless PTU 200 transmits a PRU control signal which enables the wireless PRU 250 to perform the charging at step S417. In the power transmission mode, the wireless PTU 200 transmits charging power.

The PRU control signal transmitted by the wireless PTU 200 includes information enabling/disabling the charging of the wireless PRU 250 and permission information. The PRU control signal may be transmitted when the wireless PTU 200 intends to change the status of the wireless PRU 250, or may be transmitted by predetermined periods, e.g., periods of 250 ms. The wireless PRU 250 changes the setting according to the PRU control signal, and transmits the PRU dynamic signal to report on the status of the wireless PRU 250 at steps S418 and S419. The PRU dynamic signal transmitted by the wireless PRU 250 includes at least one of information on a voltage, a current, a status of the wireless PRU 250, and temperature. In this event, the status of the wireless PRU 250 may be referred to as an On status.

Meanwhile, the PRU dynamic signal includes a data structure as indicated in Table 3.

TABLE 3

| Field | Octets | Description | Use | Units |
| --- | --- | --- | --- | --- |
| optional fields | 1 | defines which optional fields are populated | mandatory | |
| Vrect | 2 | voltage at diode output | mandatory | mV |
| Irect | 2 | current at diode output | mandatory | mA |
| Vout | 2 | voltage at charge/battery port | optional | mV |
| Iout | 2 | current at charge/battery port | optional | mA |
| temperature | 1 | temperature of PRU | optional | Deg C. from - 40 C. |
| Vrect min dyn | 2 | Vrect low limit (dynamic value) | optional | mV |
| Vrect set dyn | 2 | desired Vrect (dynamic value) | optional | mV |
| Vrect high dyn | 2 | Vrect high limit (dynamic value) | optional | mV |
| PRU alert | 1 | warnings | mandatory | Bit field |
| RFU(Reserved for Future Use) | 3 | undefined | | |

The PRU dynamic signal may include at least one of optional field information, voltage information of the rear end of the rectifier of the wireless PRU 250 ('Vrect'), current information of the rear end of the rectifier of the wireless PRU 250 ('Irect'), voltage information of the rear end of the DC/DC converter of the wireless PRU 250 ('Vout'), current information of the rear end of the DC/DC converter of the wireless PRU 250 ('Iout'), temperature information ('temperature'), minimum voltage value information of the rear end of the rectifier of the wireless PRU 250 ('Vrect min dyn'), optimal voltage value information of the rear end of the rectifier of the wireless PRU 250 ('Vrect set dyn'), maximum voltage value information of the rear end of the rectifier of the wireless PRU 250 ('Vrect high dyn'), and alert information ('PRU alert'), as indicated in Table 3.

The alert information may have a data structure as indicated in Table 4 below.

TABLE 4

| 7 | 6 | 5 | 4 | 3 | 2 | 1 | 0 |
| --- | --- | --- | --- | --- | --- | --- | --- |
| Over voltage | Over current | Over temperature | Charge complete | TA detect | Transition | Restart request | RFU |

The alert information may include an overvoltage, an overcurrent, an over temperature, charge complete, TA detection, SA mode/NSA mode transition, restart request and the like, as indicated in Table 4.

The wireless PRU 250 receives the PRU control signal to perform the charging. For example, the wireless PTU 200 transmits the PRU control signal to enable the wireless PRU 250 to be charged when the wireless PTU 200 has sufficient power to charge the wireless PRU 250. On the other hand, the PRU control signal may be transmitted whenever a charging state is changed. The PRU control signal may be transmitted by periods, e.g., every 250 ms, or transmitted when a parameter is changed. The PRU control signal may be set to be transmitted within a preset threshold time, e.g., within one second, even though the parameter is not changed.

Meanwhile, the wireless PRU 250 detects generation of errors. The wireless PRU 250 transmits an alert signal to the wireless PTU 200 at step S420. The alert signal may be transmitted in the form of the PRU dynamic signal or a PRU alert signal. For example, the wireless PRU 250 may transmit a PRU alert field of Table 3 reflecting an error state to the wireless PTU 200. Alternatively, the wireless PRU 250 may transmit a single alert signal, e.g., the PRU alert signal, indicating the error state to the wireless PTU 200. When receiving the alert signal, the wireless PTU 200 enters a latch fault mode at step S422. The wireless PRU 250 enters a null state at step S423.

Figure 5:
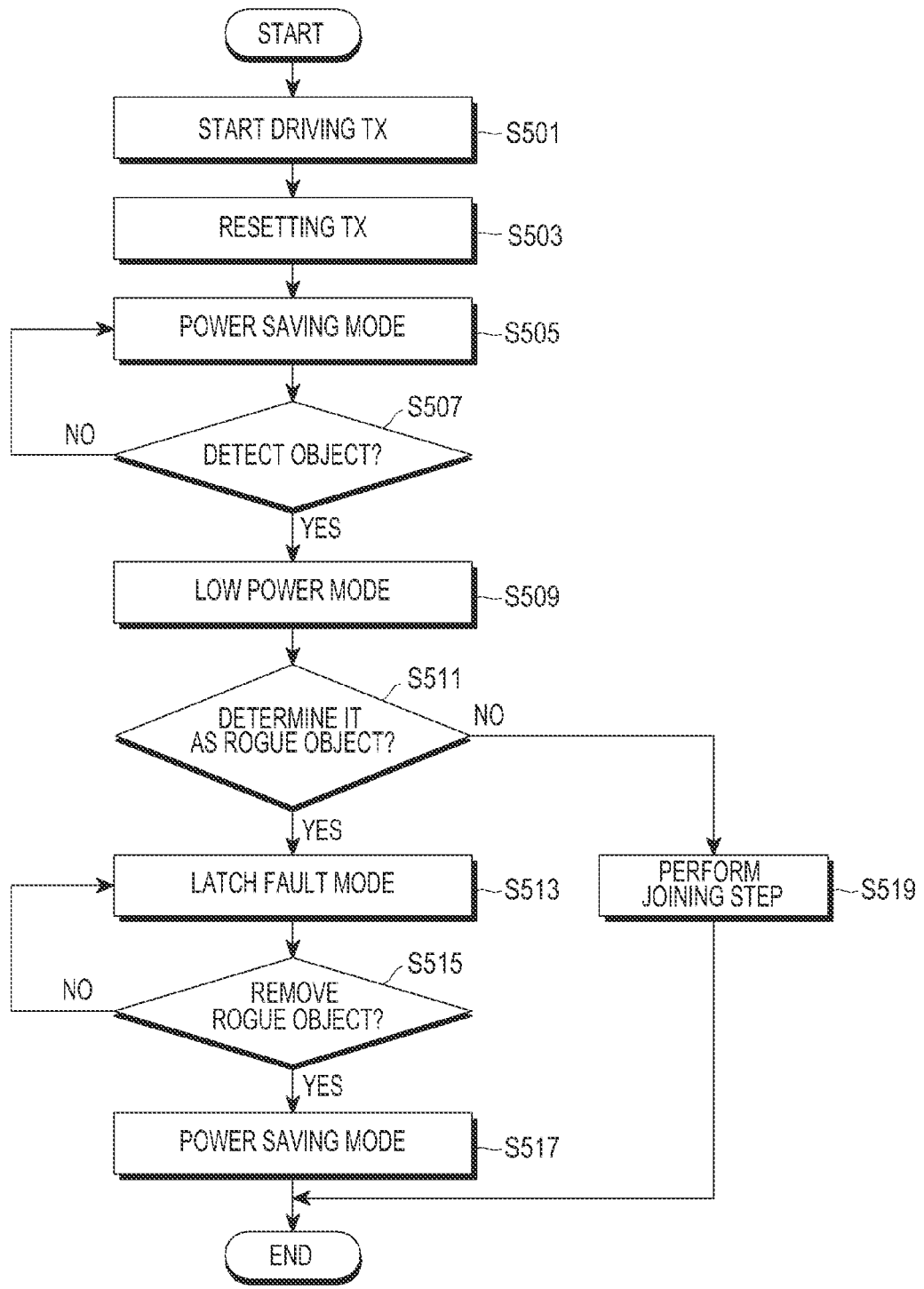
FIG. 5 is a flowchart illustrating the operations of the wireless power transmitting and the wireless power receiving, according to another embodiment of the present invention.
Figure 6:
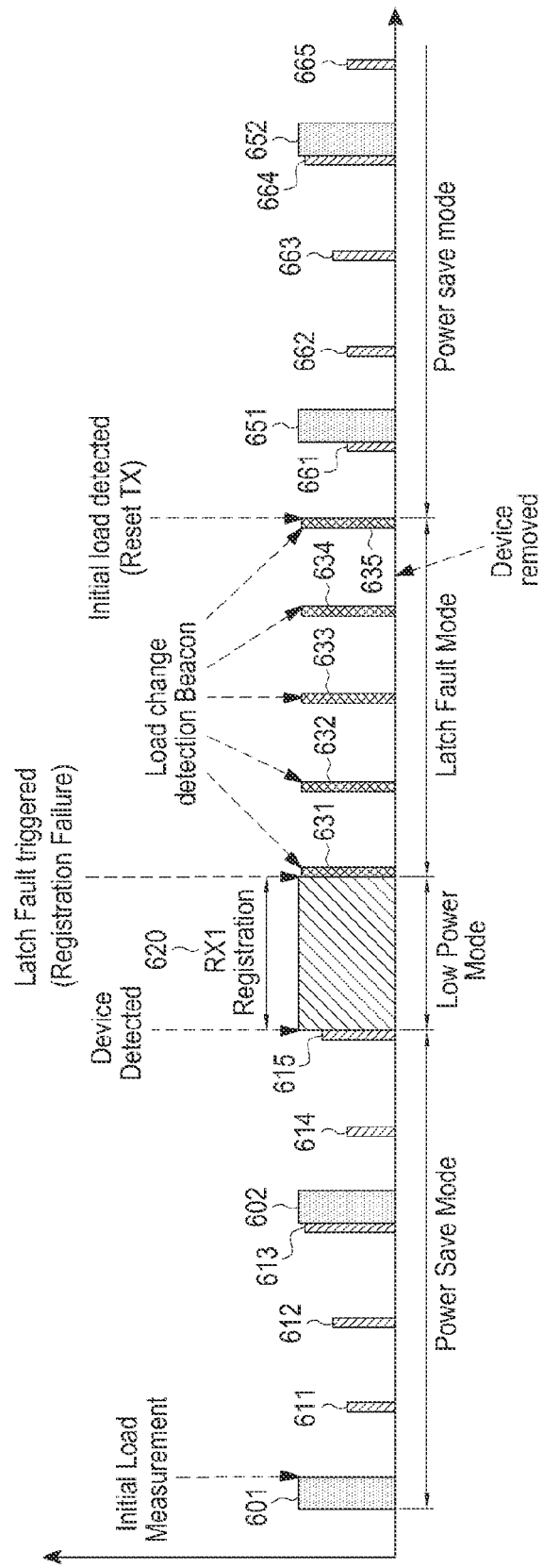
FIG. 6 is a graph illustrating an amount of electric power on a time axis, in which the electric power is applied by a wireless PTU.

FIG. 5 is a flowchart illustrating operations of the wireless PTU and the wireless power receiving unit, according to another embodiment of the present invention. The control method of FIG. 5 will be described in more detail with reference to FIG. 6. FIG. 6 is a graph illustrating an amount of electric power on a time axis according to the embodiment of FIG. 5, in which the electric power is applied by a wireless PTU.

As shown in FIG. 5, the wireless PTU initiates the operation at step S501. Further, the wireless PTU resets an initial configuration at step S503. The wireless PTU enters a power saving mode at step S505. Here, the power saving mode may be a section where the wireless PTU applies power having different amounts to the power transmitter. For example, the power saving mode may correspond to a section where the wireless PTU applies second power 601 and 602 and third power 611, 612, 613, 614, and 615 to the power transmitter in FIG. 6. The wireless PTU periodically applies the second power 601 and 602 according to a second period. When the wireless PTU applies the second power 601 and 602, the applying may continue for a second term. The wireless PTU periodically applies the third power 611, 612, 613, 614, and 615 according to a third period. When the wireless PTU applies the third power 611, 612, 613, 614, and 615, the applying may continue for a third term. Meanwhile, although it is illustrated that power values of the third power 611, 612, 613, 614, and 615 are different from each other, the power values of the third power 611, 612, 613, 614, and 615 may be the same.

The wireless PTU outputs the third power 611 and then outputs the third power 612 having the same amount of power as the third power 612. If the wireless PTU outputs the third power having the same magnitude, the amount of the third power may be a sufficient amount to detect a minimal sized wireless power receiving, e.g., a wireless power receiving of a Category 1.

Further, the wireless PTU outputs the third power 611 and then outputs the third power 612 having different amount of the power from the third power 611. When the wireless PTU outputs the third power having the different amount as described above, the amount of the third power is sufficient to detect a wireless power receiving unit of Categories 1 to 5. For example, the third power 611 may have the amount of power sufficient to detect the wireless power receiving unit of the Category 1, and the third power 612 may have the amount of power sufficient to detect the wireless power receiving unit of the category 3. The third power 613 may have the amount of power sufficient to detect the wireless power receiving unit of the Category 5.

Meanwhile, the second power 601 and 602 may be power which can drive the wireless power receiving unit. More specifically, the second power 601 and 602 may have an amount of power which can drive the controller and the communication unit of the wireless power receiving unit.

The wireless PTU applies the second power 601 and 602 and the third power 611, 612, 613, 614, and 615 to the power receiver according to a second period and a third period, respectively. When the wireless power receiving unit is disposed on the wireless PTU, impedance at a point of the wireless PTU is changed. The wireless PTU detects a change in the impedance while the second power 601 and 602 and the third power 611, 612, 613, 614, and 615 are applied. For example, the wireless PTU detects the change in the impedance while the third power 615 is applied. Accordingly, the wireless PTU may detect an object at step S507. When the object is not detected at step S507, the wireless PTU maintains a power saving mode in which different power is periodically applied at step S505.

Meanwhile, when there is the change in the impedance and thus the object is detected at step S507, the wireless PTU enters a low power mode. Here, the low power mode is a mode in which the wireless PTU applies driving power having a sufficient amount of power to drive the controller and the communication unit of the wireless power receiving unit. For example, in FIG. 6, the wireless PTU applies the driving power 620 to the power transmitter. The wireless power receiving unit receives the driving power 620 to drive the controller and the communication unit. The wireless power receiving unit performs communication with the wireless power transmitting according to a predetermined scheme based on the driving power 620. For example, the wireless power receiving unit transmits/receives data required for an authentication and enter the wireless power network managed by the wireless PTU based on the data. However, when a rogue object is arranged instead of the wireless power receiving unit, the transmission/reception of the data cannot be performed. Accordingly, the wireless PTU determines whether the arranged object is the rogue object at step S511. For example, when the wireless PTU does not receive a response from the object within a preset time, the wireless PTU determines the object as the rogue object.

If it is determined that the object is the rogue object at step S511, the wireless PTU enters the latch fault mode at step S513. If it is determined that the object is not the rogue object in step S511, however, an entering step is performed at step S519. For example, the wireless PTU periodically applies the first power 631, 632, 633 and 634 of FIG. 6 by a first period. The wireless PTU detects a change in impedance while applying the first power. For example, when the rogue object is removed at step S515, the change in the impedance is detected and the wireless PTU determines that the rogue object is removed. Alternatively, when the rogue object is not removed at step S515, the wireless PTU may not detect the change in the impedance and may determine that the rogue object is not removed. When the rogue object is not removed, the wireless PTU outputs at least one of a lamp and a warning sound to inform a user that a state of the wireless PTU is an error state. Accordingly, the wireless PTU may include an output unit that outputs at least one of the lamp and the warning sound.

When it is determined that the rogue object is not removed in step S515, the wireless PTU maintains the latch fault mode at step S513. When it is determined that the rogue object is removed in step S515, on the other hand, the wireless PTU enters the power saving mode again in step S517. For example, the wireless PTU applies second power 651 and 652 and third power 661 to 665 of FIG. 6.

As described above, when the rogue object is arranged instead of the wireless PRU, the wireless PTU enters the latch fault mode. In addition, the wireless PTU determines whether the rogue object is removed, according to the change in the impedance based on the power applied in the latch fault mode. That is, a condition of the entry into the latch fault mode in the embodiment of FIGS. 5 and 6 may be the arrangement of the rogue object. Meanwhile, the wireless PTU may have various conditions of the entry into the latch fault mode as well as the arrangement of the rogue object. For example, the wireless PTU may be cross-connected with the arranged wireless PRU, and may also enter the latch fault mode in this case.

Accordingly, when the cross-connection is achieved, the wireless PTU is required to return to an initial state and the wireless PRU is required to be removed. The wireless PTU may set the cross-connection, in which the wireless PRU arranged on another wireless PTU enters the wireless power network, as a condition of entry into the latch fault mode. An operation of the wireless PTU when the error is generated which includes the cross-connection will be described with reference to FIG. 7.

Figure 7:
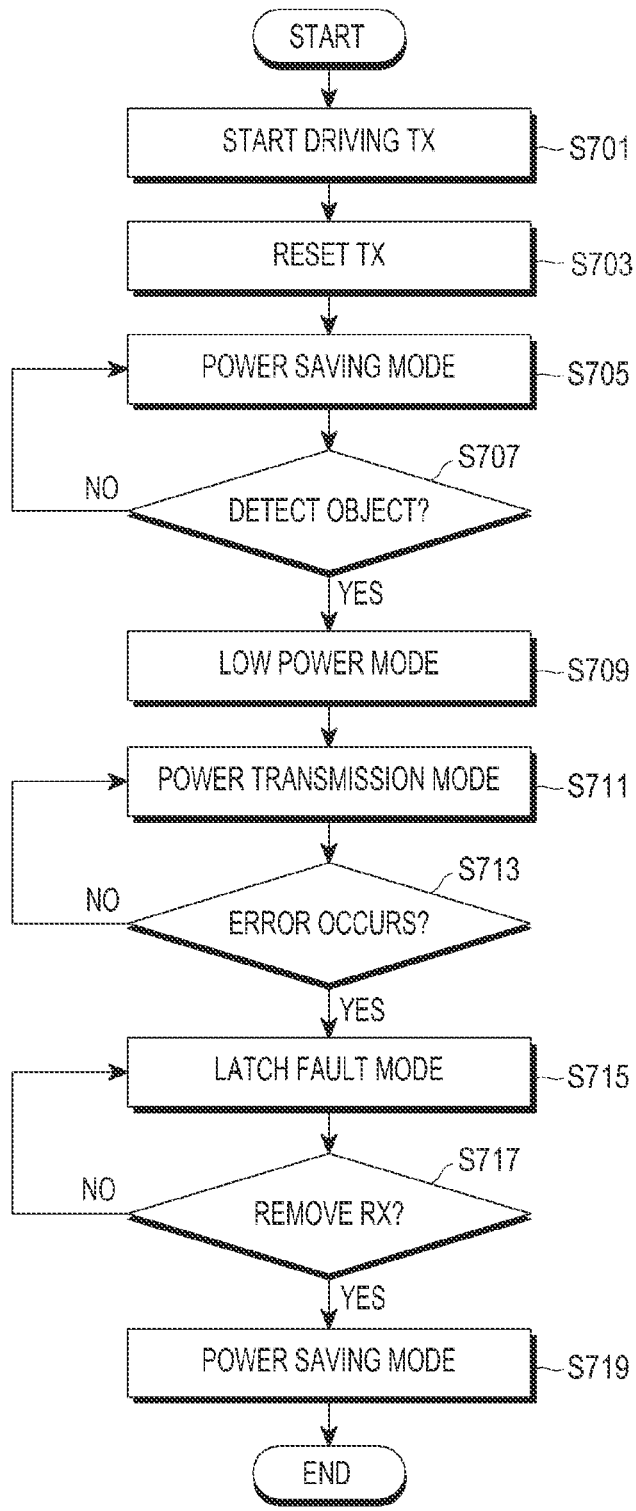
FIG. 7 is a flowchart illustrating a process of controlling the wireless power transmitting, according to the embodiment of the present invention.
Figure 8:
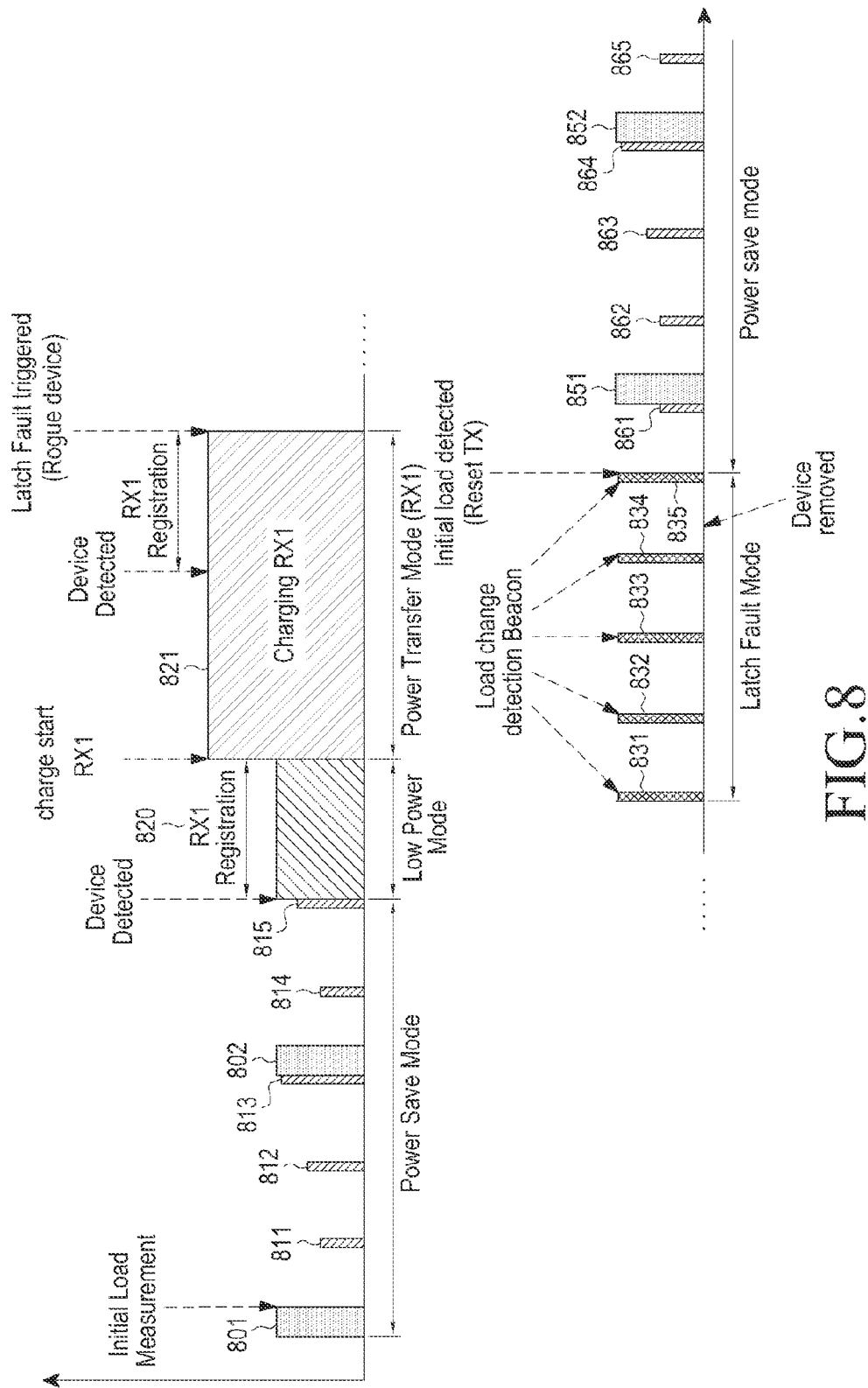
FIG. 8 is a graph illustrating an amount of electric power on a time axis according to the embodiment of FIG. 7, in which the electric power is applied by the wireless power transmitting.

FIG. 7 is a flowchart illustrating a process of controlling the wireless PTU, according to the embodiment of the present invention. The control process of FIG. 7 will be described in more detail with reference to FIG. 8. FIG. 8 is a graph illustrating an amount of electric power on a time axis according to the embodiment of FIG. 7, in which the electric power is applied by the wireless PTU.

The wireless PTU initiates the operation at step S701. Further, the wireless PTU resets an initial configuration at step S703. The wireless PTU enters the power saving mode at step S705. Here, the power saving mode may be a section where the wireless PTU applies different types of power having different amounts to the power transmitter. For example, the power saving mode may correspond to a section where the wireless PTU applies second power 801 and 802 and third power 811, 812, 813, 814, and 815 to the power transmitter in FIG. 8. The wireless PTU periodically applies the second power 801 and 802 by second period. When the wireless PTU applies the second power 801 and 802, the second power 801 and 802 is continuously applied for a second term. The wireless PTU periodically applies the third power 811, 812, 813, 814, and 815 by a third period. When the wireless PTU applies the third power 811, 812, 813, 814, and 815, the third power is continuously applied for a third term. Meanwhile, although it is illustrated that power values of the third power 811, 812, 813, 814, and 815 are different from each other, the power values of the third power 811, 812, 813, 814, and 815 may be or identical.

Meanwhile, the second power 801 and 802 may be power which can drive the wireless PRU. More specifically, the second power 801 and 802 may have an amount of power sufficient to drive the controller and the communication unit of the wireless PRU.

The wireless PTU applies the second power 801 and 802 and the third power 811, 812, 813, 814, and 815 to the power receiver by a second period and a third period, respectively. When the wireless PRU is disposed on the wireless PTU, impedance at a point of the wireless PTU is changed. The wireless PTU detects the change in the impedance while the second power 801 and 802 and the third power 811, 812, 813, 814, and 815 are applied. For example, the wireless PTU detects the change in the impedance while the third power 815 is applied. Accordingly, the wireless PTU detects an object at step S707. When the object is not detected in step S707, the wireless PTU maintains the power saving mode in which different power is periodically applied at step S705.

Meanwhile, when the impedance is changed and thus the object is detected at step S707, the wireless PTU enters the low power mode at step S709. Here, the low power mode is a mode in which the wireless PTU applies driving power having the amount of power sufficient to drive the controller and the communication unit of the wireless PRU. For example, in FIG. 8, the wireless PTU applies driving power 820 to the power transmitter. The wireless PRU receives the driving power 820 to drive the controller and the communication unit. The wireless PRU performs communication with the wireless PTU according to a predetermined scheme based on the driving power 820. For example, the wireless PRU transmits/receives data required for an authentication and enter the wireless power network managed by the wireless PTU based on the data.

Thereafter, the wireless PTU enters the power transmission mode in which charging power is transmitted at step S711. For example, the wireless PTU applies the charging power 821 as shown in FIG. 8, and the charging power is transmitted to the wireless PRU.

The wireless PTU determines whether an error occurs in the power transmission mode. Here, the error may be the rogue object arranged on the wireless PTU, a cross-connection, an overvoltage, an overcurrent, an over-temperature, and the like. The wireless PTU may include a sensing unit (not shown) that detects the overvoltage, the overcurrent, over-temperature and the like. For example, the wireless PTU measures a voltage or a current at a reference position. When the measured voltage or current is larger than a threshold, it is determined that conditions of the overvoltage or the overcurrent are satisfied. Alternatively, the wireless PTU may include a temperature sensing means (not shown) and the temperature sensing means may measure temperature at a reference position of the wireless PTU. When temperature at the reference position is larger than a threshold, the wireless power transmitting determines that a condition of the over-temperature is satisfied.

Although it is shown in the embodiment of FIG. 8 that the error occurs in which the rogue object is additionally arranged on the wireless PTU, the error is not limited thereto and it will be easily understood by those skilled in the art that the wireless PTU operates through a similar process with respect to the arrangement of the rogue object, the cross-connection, the overvoltage, the overcurrent, and the over-temperature.

When the error is not generated at step S713, the wireless PTU maintains the power transmission mode at step S711. Meanwhile, when the error occurs at step S713, the wireless power transmitting enters the latch fault mode at step S715. For example, the wireless PTU applies first power 831, 832, 833, 834, and 835 as shown in FIG. 8. Further, the wireless PTU outputs an error occurrence display including at least one of a lamp and a warning sound during the latch fault mode. When it is determined that the rogue object is not removed at step S717, the wireless PTU maintains the latch fault mode at step S715. Meanwhile, when it is determined that the rogue object is removed in step S717, the wireless PTU enters the power saving mode again at step S719. For example, the wireless PTU applies second power 851 and 852 and third power 861, 862, 863, 864, and 865 of FIG. 8.

Up to now, the operation of the wireless PTU when the error occurs while the wireless PTU transmits the charging power has been described. Hereinafter, an operation of the wireless PTU when a plurality of wireless PRU receives charging power from the wireless PTU will be described.

Figure 9:
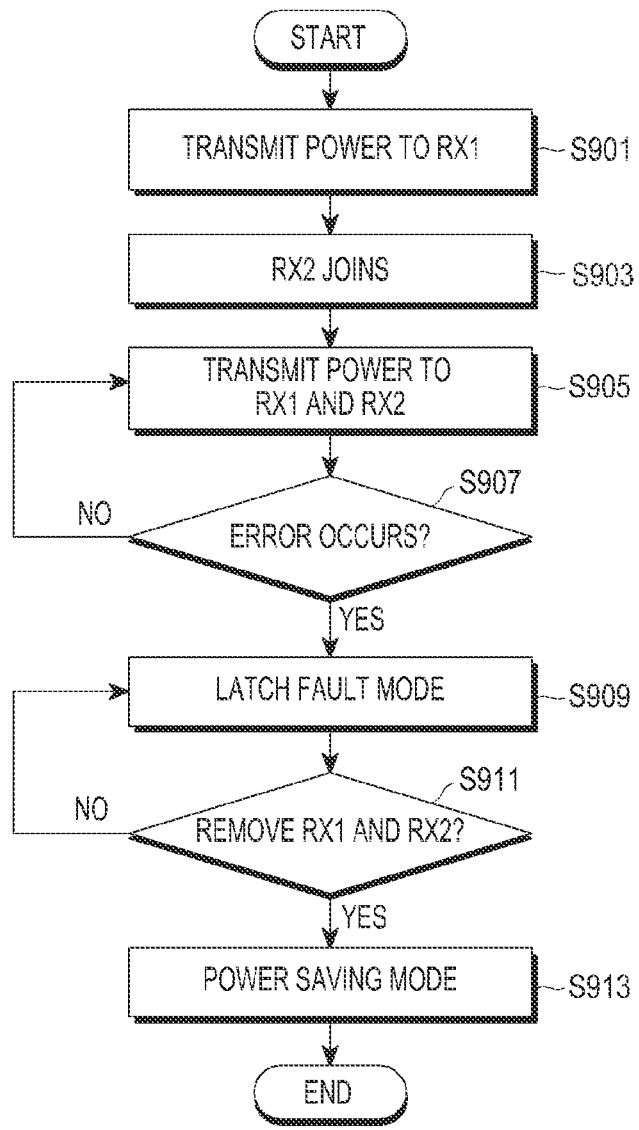
FIG. 9 is a flowchart illustrating a process of controlling the wireless PTU, according to the embodiment of the present invention.
Figure 10:
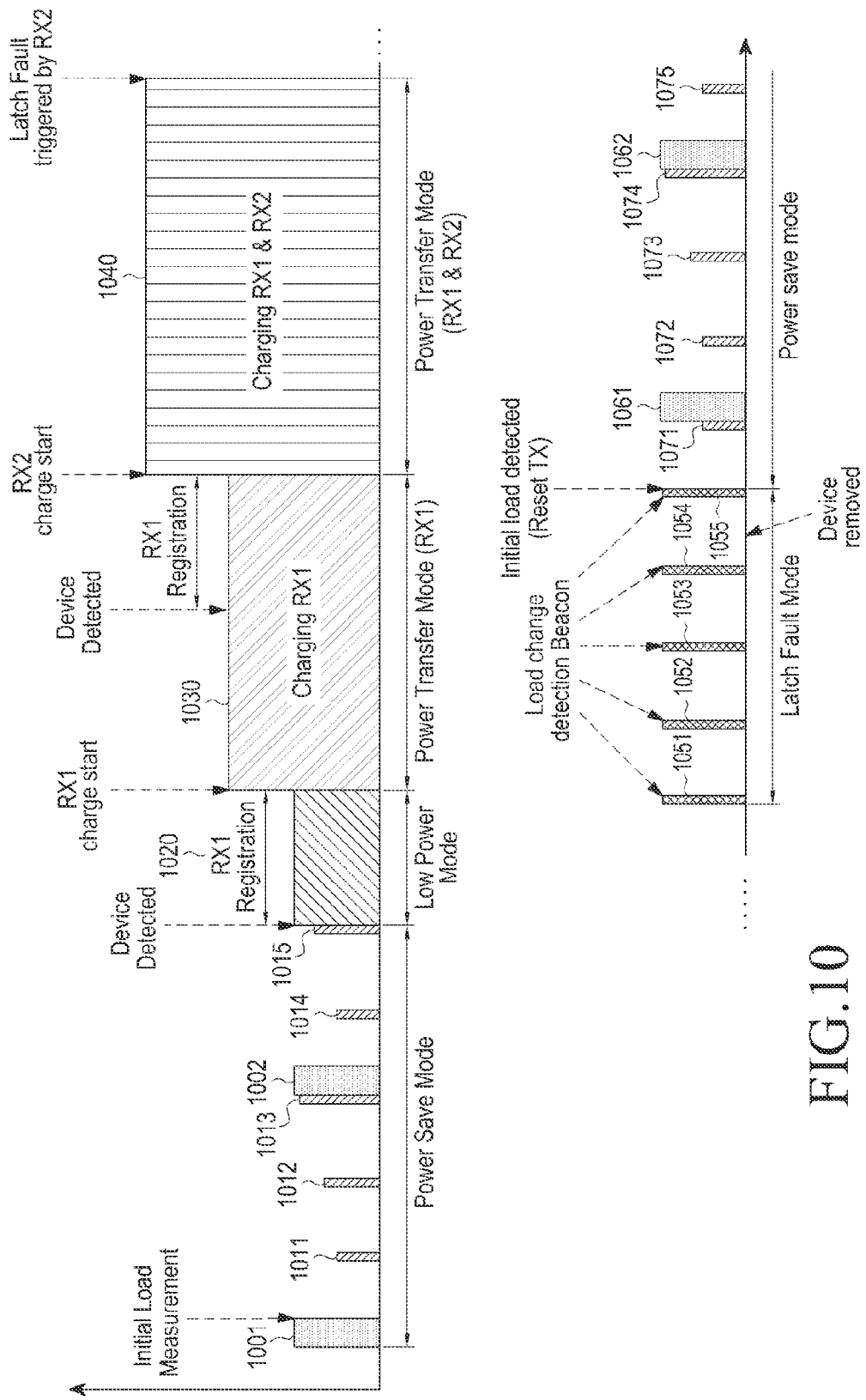
FIG. 10 is a graph illustrating an amount of electric power on a time axis according to the embodiment of FIG. 9, in which the electric power is applied by a wireless PTU.

FIG. 9 is a flowchart illustrating a process of controlling the wireless PTU, according to the embodiment of the present invention. The process of FIG. 9 will be described in more detail with reference to FIG. 10. FIG. 10 is a graph illustrating an amount of electric power on a time axis according to the embodiment of FIG. 9, in which the electric power is applied by a wireless PTU.

As shown in FIG. 9, the wireless PTU may transmits charging power to a first wireless PRU at step S901. Further, the wireless PTU additionally enables a second wireless PRU to enter the wireless power network at step S903. The wireless PTU transmits charging power to the second wireless PRU at step S905. More specifically, the wireless PTU applies a sum of the charging power required by the first wireless PRU and the second wireless PRU to the power receiver.

FIG. 10 illustrates an embodiment of steps S901, S903 to S905. For example, the wireless PTU maintains a power saving mode in which the second power 1001 and 1002 and the third power 1011, 1012, 1013, 1014 and 1015 are applied. Then, the wireless PTU detects the first wireless PRU and enter the low power mode in which the power 1020 is maintained. Next, the wireless PTU enters the power transmission mode in which first charging power 1030 is applied. The wireless PTU detects the second wireless PRU and enables the second wireless PRU to enter wireless power network. Further, the wireless PTU applies second charging power 1040 having a power amount corresponding to a sum of power amounts required by the first wireless PRU and the second wireless PRU.

Referring to FIG. 9 again, the wireless PTU detects an occurrence of an error at step S907 while charging power is transmitted to both the first and second wireless PRU at step S905. Here, the error may be an arrangement of a rogue object, a cross-connection, an overvoltage, an overcurrent, an over-temperature, and the like. When the error does not occur at step S907, the wireless PTU maintains the applying of the second charging power 1040.

Meanwhile, when the error occurs in step S907, the wireless PTU enters the latch fault mode at step S909. For example, the wireless PTU applies the first power 1051, 1052, 1053, 1054, and 1055 of FIG. 10 by a first period. The wireless PTU determines whether both the first wireless PRU and the second wireless PRU are removed at step S911. For example, the wireless PTU detects a change in impedance while applying the first power 1051, 1052, 1053, 1054, and 1055. The wireless PTU determines whether both the first wireless PRU and the second wireless PRU are removed based on whether the impedance is returned to an initial value.

When it is determined that both the first wireless PRU and the second wireless PRU are removed in step S911, the wireless PRU enters the power saving mode at step S913. For example, the wireless PTU applies the second power 1061 and 1062 and the third power 1071, 1072, 1073, 1074, and 1075 by second periods and third periods, respectively.

As described above, even if the wireless PTU applies charging power to a plurality of wireless PRU, the wireless PTU determines whether the wireless PRU or the rogue object is easily removed when the error occurs.

Figure 11:
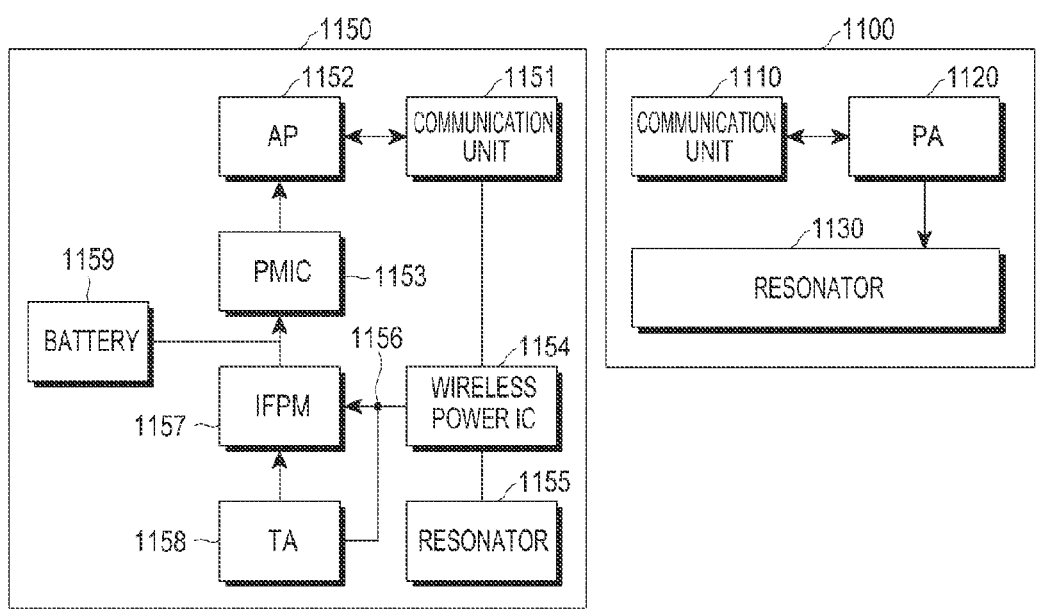
FIG. 11 is a block diagram illustrating the wireless PTU and the wireless PRU, according to the embodiment of the present invention.

FIG. 11 is a block diagram illustrating the wireless PTU and the wireless PRU, according to the embodiment of the present invention.

The wireless PTU 200 includes a communication unit 1110, a Power Amplifier (PA) 1120, and a resonator 1130. The wireless PRU 250 includes a communication unit 1151, an Application Processor (AP) 1152, a Power Management Integrated Circuit (PMIC) 1153, a Wireless Power Integrated Circuit (WPIC) 1154, a resonator 1155, an Interface Power Management (IFPM) IC 1157, a Travel Adapter (TA) 1158, and a battery 1159.

The communication unit 1110 communicates with the communication unit 1151 based on a predetermined scheme, e.g., a BLE scheme. The communication unit 1151 of the wireless power transmitting unit 200 transmits the PRU dynamic signal having the data configuration of Table 3 to the communication unit of the wireless PTU 200. As described above, the PRU dynamic signal may include at least one of voltage information, current information, temperature information and alert information of the wireless PRU 250.

A value of the power output from the power amplifier 1120 may be adjusted based on the received PRU dynamic signal. For example, when the overvoltage, the overcurrent, and the over-temperature are applied to the wireless PRU 250, a power value output from the power amplifier 1120 is reduced. Further, when a voltage or current of the wireless PRU 250 is smaller than a preset value, a value of power output from the power amplifier 1120 is increased.

Charging power from the resonator 1130 may be wirelessly transmitted to the resonator 1155.

The WPIC 1154 rectifies the charging power received from the resonator 1155 and performs DC/DC conversion. The WPIC 1154 uses the converted power to operate the communication unit 1151 or to charge the battery 1159.

Meanwhile, a wired charging terminal may be inserted into the travel adapter 1158. The travel adapter 1158 may have the wired charging terminal such as a 30 pin connector or USB connector which is inserted in the travel adapter 1158, and may receive the power supplied from an external power source to charge the battery 1159.

The IFPM 1157 processes power applied from the wired charging terminal and outputs the processed power to the battery 1159 and the PMIC 1153.

The PMIC 1153 manages power which is wirelessly received, power which is received through a wire, or power which is applied to each of the components of the wireless PRU 250. The AP 1152 receives information on the power from the PMIC 1153, and controls the communication unit 1151 to transmit the PRU dynamic signal of reporting the power information.

Meanwhile, a node 1156 connected to the WPIC 1154 is connected to the travel adapter 1158. When the wired charging connector is inserted into the travel adapter 1158, a predetermined voltage, e.g., a voltage of 5 V, is applied to the node 1156. The WPIC 1154 monitors the voltage applied to the node 1156 to determine whether the travel adapter is inserted.

On the other hand, a condition such as an overvoltage, an overcurrent, an over-temperature and the like may occur in the wireless PRU 250. In the first embodiment of the present invention, when the condition of the over-temperature is satisfied in the wireless PRU 250, a current status of the wireless PRU 250 is reported to the wireless PTU 200. In the second embodiment of the present invention, when the condition of the overvoltage is satisfied in the wireless PRU 250, a current status of the wireless PRU 250 is reported to the wireless PTU 200. In the third embodiment of the present invention, when the condition of the overcurrent is satisfied in the wireless PRU 250, a current status of the wireless PTU 200 is reported to the wireless PTU 200.

Firstly, a process of controlling the over-temperature when the over-temperature condition occurs in the wireless PRU 250 according to the first embodiment of the present invention will be described with reference to FIG. 12.

Figure 12:
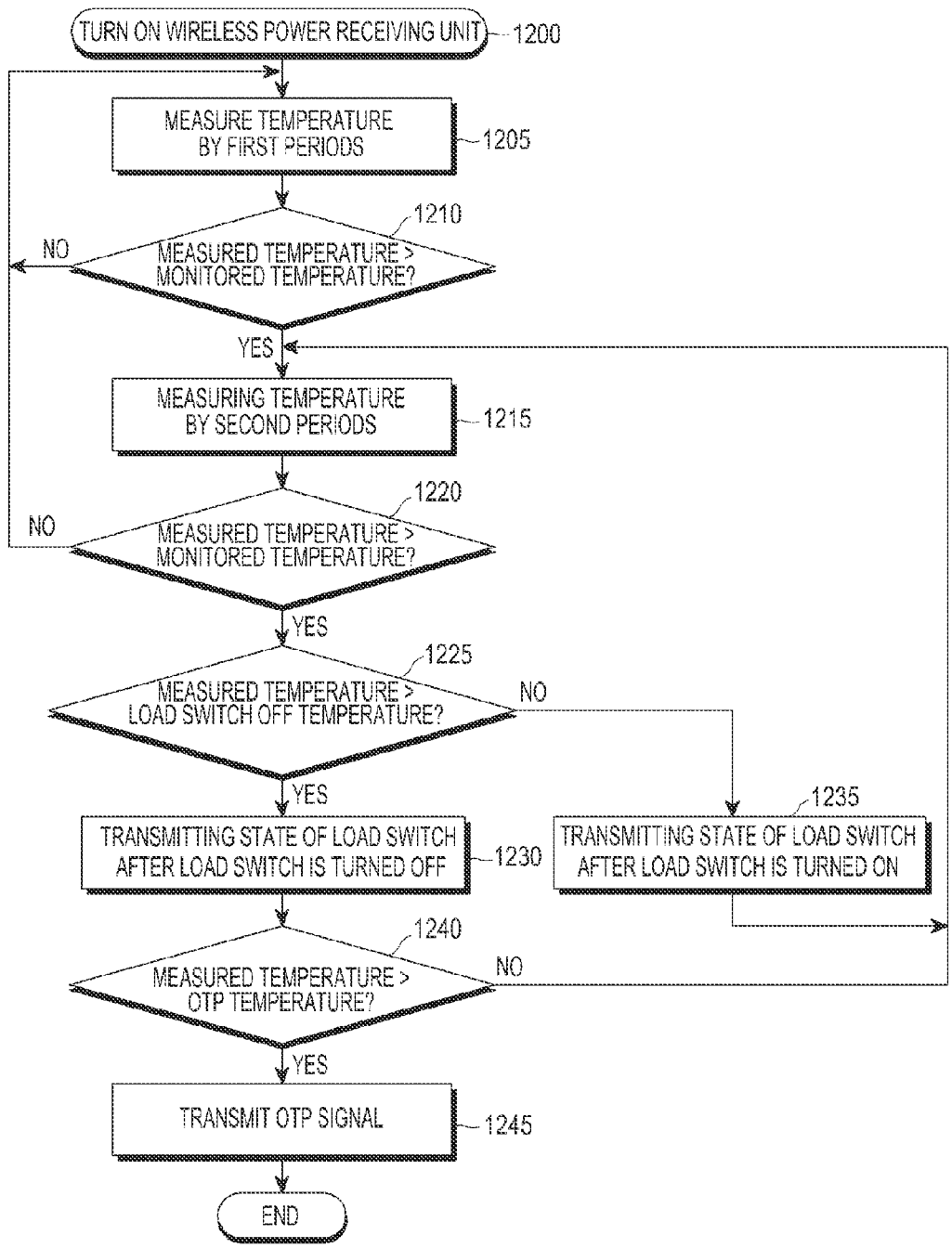
FIG. 12 is a flowchart illustrating a process of controlling over-temperature according to a first embodiment of the present invention, when a wireless PRU is overheated.

Referring to FIG. 12, the wireless PRU 250 is turned on at step 1200. The wireless PRU 250 measures a temperature by the first predetermined period, e.g., about 10 sec, in correspondence to a power transmission from the wireless PTU 200 at step 1205. According to the embodiment of the present invention, the wireless PRU 250 may further include a temperature measuring unit (not shown) for measuring a temperature of a rectifier 254 or a temperature of the battery. At step 1210, the wireless PRU 250 determines whether the measured temperature is higher than a monitoring temperature required to be monitored. If the measured temperature is higher than the monitoring temperature, it is determined that the temperature in the wireless PRU 250 increases. Since it is required to monitor the charging state, the temperature is measured by a second predetermined period, e.g., a short time interval of 1 sec at step 1215. In this event, the second period is shorter than the first period. Then, if it is determined at step 1220 that the temperature measured by periods is lower than the monitoring temperature, an abnormal charging status such as over-temperature does not occur. Accordingly, it is returned to step 1205 so as to periodically measure the temperature of the wireless PRU 250 again.

If it is determined in step 1220 that the measured temperature is higher than the monitoring temperature, however, it is determined whether the measured temperature is higher than a load switch off temperature at step 1225. In this event, the load switch off temperature is a predetermined temperature at which a switch 256 connecting a charging unit, e.g., a load unit 257, of the wireless PRU 250 to an outside must be off, and is set between the monitoring temperature and a temperature for an over-temperature protection (OTP). That is, the switch 256 is off, thereby interrupting an application of the transmitted power.

If it is determined that the measured temperature is lower than the load switch off temperature, the wireless PRU 250 turns the switch 256 on at step 1235, and then transmits a status of the load switch to the wireless PTU 200. At this time, when the switch 256 is currently turned on, the state in which the switch 256 is turned on is maintained. The load switch status may be transmitted by using the PRU dynamic signal. Then, the wireless PRU 250 returns to step 1215, and measures the temperature by periods.

On the other hand, when the measured temperature is higher than the load switch off temperature at step 1225, the switch 256 is turned off, and then the status of the load switch is transmitted through the communication unit 253 to the wireless PTU 200 at step 1230. Next, in the state that the load switch is turned off, it is determined at step 1240 whether the measured temperature is higher than the OTP temperature. If the measured temperature is higher than the OTP temperature, the wireless PRU 250 transmits an OTP signal (message) informing of an over-temperature state of the wireless PRU 250 to the wireless PTU 200 at step 1245. Such an OTP signal may be transmitted by using the alert information having the data configuration indicated in Table 4.

Hereinafter, the operation of the wireless PTU 200 will be described with reference to FIG. 13.

Figure 13:
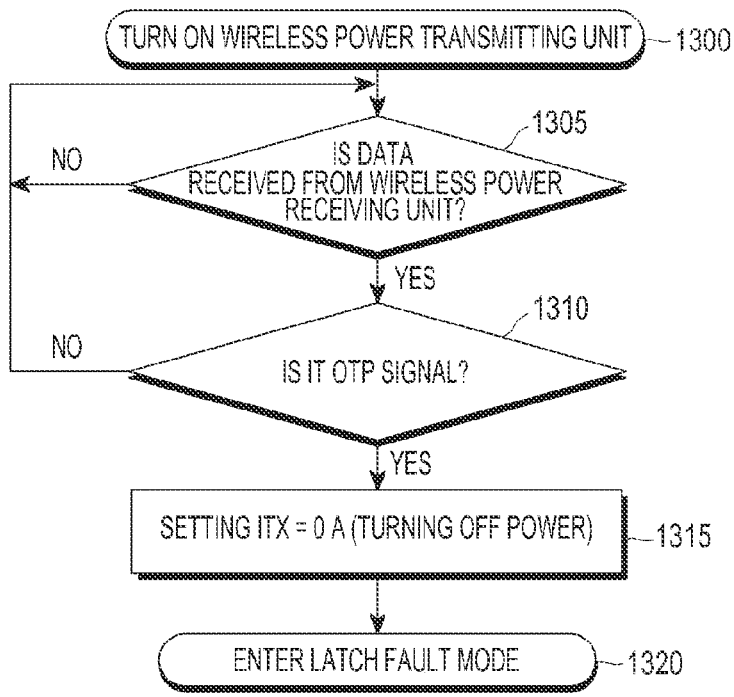
FIG. 13 is a flowchart illustrating a process of interrupting transmission of electric power in the wireless PTU in correspondence to a report on a status of the wireless PRU, according to the embodiment of the present invention.

Referring to FIG. 13, in the state in which the wireless PTU 200 is turned on in step 1300, when the data is received from the wireless PRU 250 in step 1305, it is determined based on the received data whether an OTP signal is present, in step 1310. If the OTP signal is present, a value of Itx is set to 0 amperes (A) to stop the power transmission at step 1315, and then the wireless PTU 200 enters the latch fault mode at step 1320.

Figure 14A:
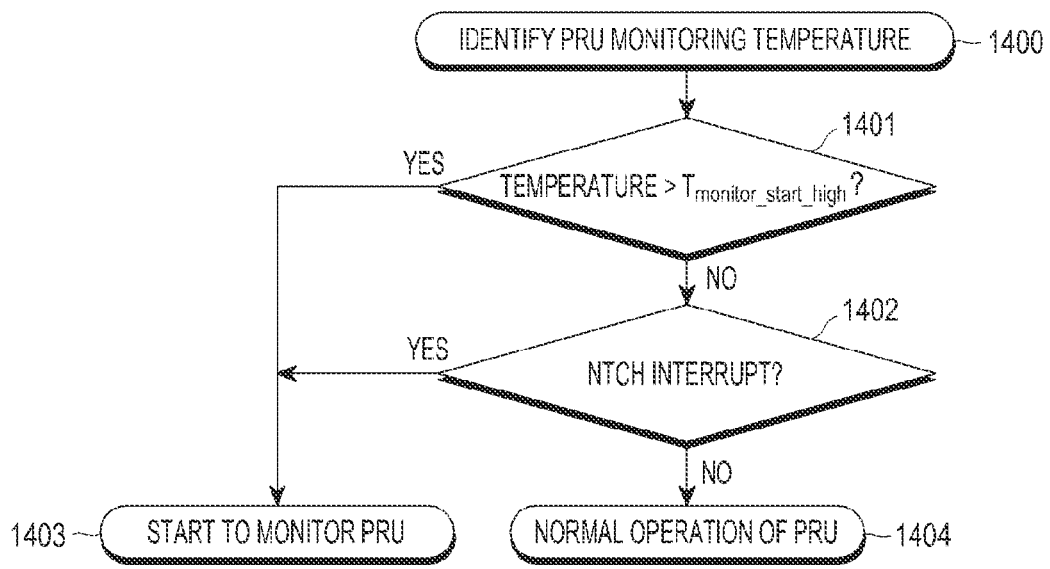
FIGS. 14A, 14B and 14C are flowcharts illustrating a process of checking a temperature of the wireless PRU in a high temperature state, according to the first embodiment of the present invention.
Figure 14B:
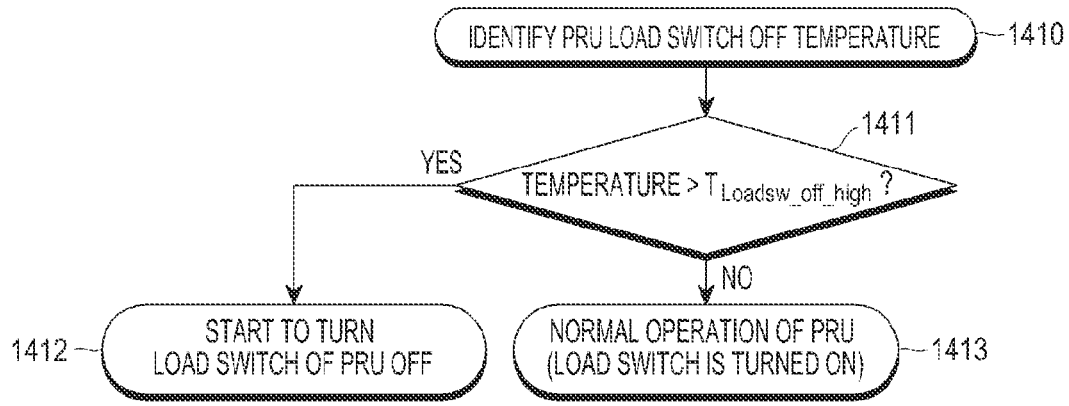
Figure 14C:
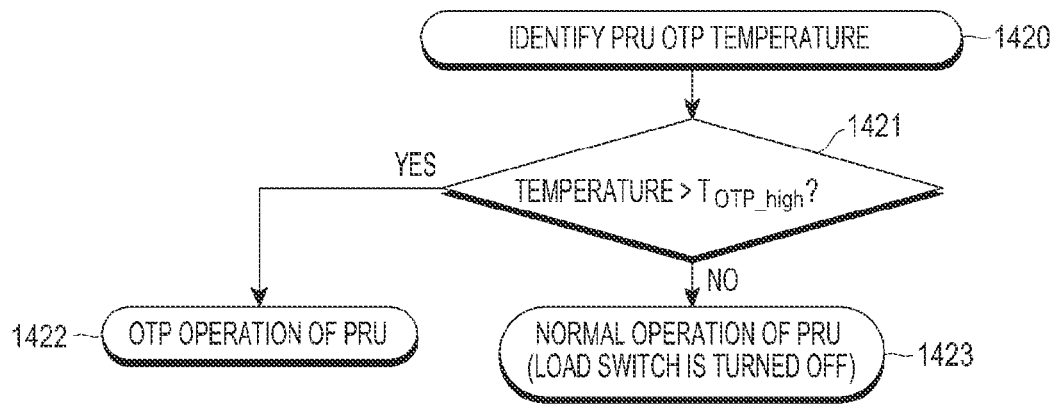

FIGS. 14A, 14B and 14C are flowcharts illustrating processes of checking a temperature in a high temperature state in the wireless PRU 250.

Referring to FIG. 14A, the wireless PRU 250 identifies the monitoring temperature at step 1400, and determines whether the measured temperature is higher than the monitoring temperature $T_{monitor\_start\_high}$ at step 1401. If the monitoring temperature increases, a periodical monitoring starts at step 1403. On the other hand, although the monitoring temperature decreases, it is determined whether a Negative Temperature Coefficient High (NTCH) interrupt occurs at step 1402. The NTCH interrupt may be occurred when a temperature of a NTC is higher than a predetermined temperature. If it is determined that the NTCH interrupt does not occur, the wireless PRU 250 normally operates at step 1404. However, even if it is determined that the NTCH interrupt occurs, the wireless PRU 250 starts the monitoring. In this event, the NTCH interrupt may be the OTP temperature managed by the PMIC 1153, e.g., a temperature before a chip is damaged.

Referring to FIG. 14B, the wireless PRU 250 identifies the load switch off temperature in step 1410, and determines whether the measured temperature is higher than the load switch off temperature $T_{Loadsw\_off\_high}$ at step 1411. If it is determined that the measured temperature is higher than the load switch off temperature, the wireless PRU 250 starts to turn the load switch off at step 1412. If it is determined that the measured temperature is higher than the load switch off temperature, the wireless PRU 250 normally performs the operation in the state that the load switch is turned on at step 1413.

Referring to FIG. 14C, the wireless PRU 250 identifies the OTP temperature at step 1420, and determines whether the measured temperature is higher than the OTP temperature $T_{OTP\_high}$ at step 1421. If it is determined that the measured temperature is higher than the OTP temperature, the wireless PRU 250 starts an OTP operation at step 1422. If it is determined that the measured temperature is lower than the OTP temperature, the wireless PRU 250 normally performs the operation in the state that the load switch is turned off at step 1423.

Figure 15A:
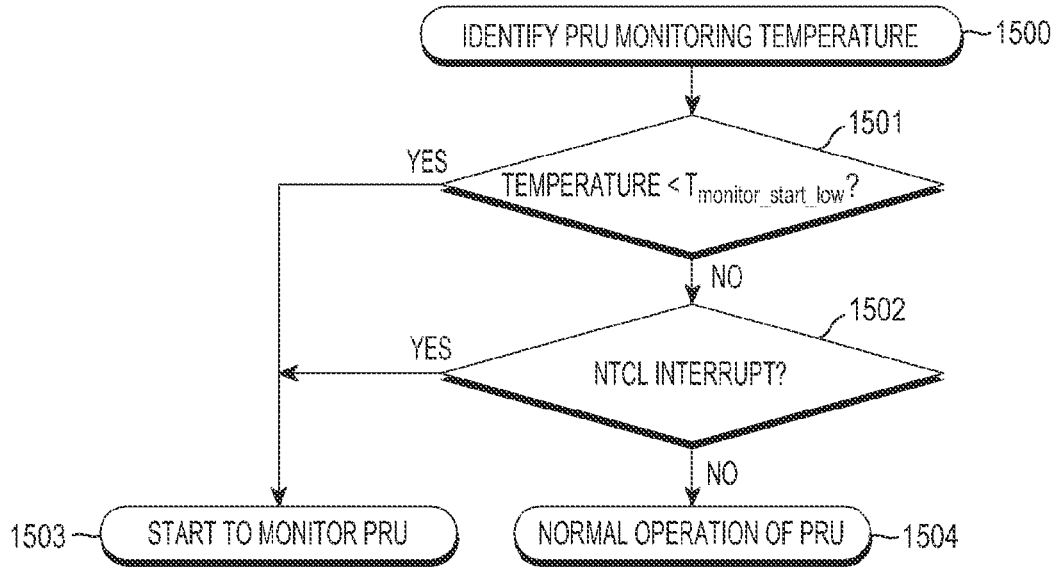
FIGS. 15A, 15B and 15C are flowcharts illustrating a process of checking a temperature of the wireless PRU in a low temperature state, according to the first embodiment of the present invention.
Figure 15B:
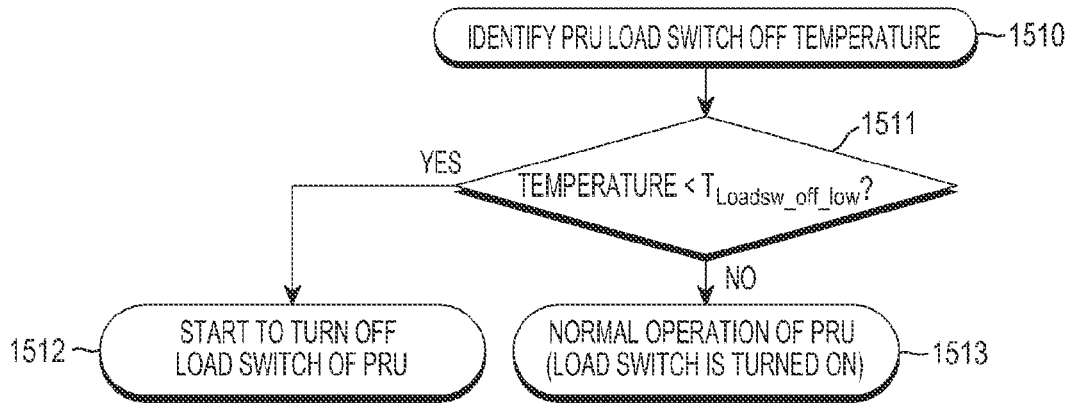
Figure 15C:
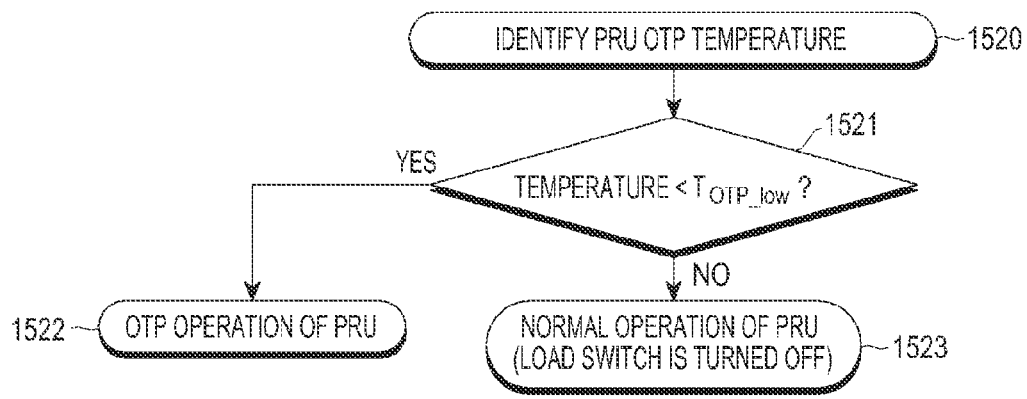

FIGS. 15A, 15B and 15C show examples of processes of checking the temperature in a low temperature state. In the wireless PRU 250, it is important to prevent over-temperature according to the wireless charging, but it is necessary to check whether the charging is normally performed. The low temperature state may occur when charging efficiency is very low. The operation in FIGS. 15A, 15B and 15C is identical to that of FIGS. 14A, 14B and 14C except that reference temperatures compared with the measured temperature are different. That is, there is difference in that it is determined whether the measured temperature is lower than the reference temperatures, e.g., a low monitoring temperature $T_{monitor\_start\_low}$, a low load switch off temperature $T_{Loadsw\_off\_low}$, a low OTP temperature $T_{OTP\_low}$, respectively. The detailed description of the determination will be omitted.

The operation of the wireless PRU 250 according to the result from the comparison of the measured temperature with the reference temperatures in FIGS. 15A, 15B and 15C is indicated in Table 5 below.

TABLE 5

| PRU Power IC | PRU Comm. IC + MCU | PTU |
|---|---|---|
| VNTC >40° C. | Frequently monitor Temp | |
| VNTC <10° C. | (every 1 s) | |
| VNTC >50° C. | Turn off Load SW | |
| VNTC <5° C. | | |

TABLE 5-continued

| PRU Power IC | PRU Comm. IC + MCU | PTU |
|---|---|---|
| VNTC >60° C.<br>VNTC <0° C. | Send OTP message to PTU | Set Itx = 0 mA and<br>Latch fault mode |

In Table 5, the measured temperature is defined as VNTC. When the VNTC is higher than the monitoring temperature $T_{monitor\_start\_low}$, e.g., 40° C. but is lower than the low monitoring temperature $T_{monitor\_start\_low}$, e.g., 10° C., it is indicated that a periodic monitoring starts. Further, if the VNTC is higher than the load switch off temperature $T_{Loadsw\_off\_low}$, e.g., 50° C., but is lower than the low load switch off temperature $T_{Loadsw\_off\_low}$, e.g., 5° C., it is indicated that the load switch is turned off. Further, if the VNTC is higher than the OTP temperature $T_{OTP\_high}$, e.g., 60° C., but lower than the low OTP temperature $T_{OTP\_low}$, e.g., 0° C., the wireless PRU 250 transmits an OTP signal to the wireless PTU 200. Accordingly, the wireless PTU is converted into the latch fault mode.

On the other hand, an operation of recovering an OTP in the wireless PRU 250 according to the result from the comparison of the measured temperature with the reference temperatures is exemplarily indicated in Table 6 below.

TABLE 6

| PRU Power IC | PRU Comm. IC + MCU | PTU |
|---|---|---|
| VNTC <50° C.<br>VNTC >5° C. | Turn on Load SW | |
| VNTC <40° C.<br>VNTC >10° C. | Infrequently monitor Temp<br>(every 10 s) | |

In Table 6, if the VNTC is lower than the load switch off temperature $T_{Loadsw\_off\_high}$, e.g., 50° C., but is higher than the low load switch off temperature $T_{Loadsw\_off\_low}$, e.g., 5° C., it is indicated that the load switch is turned on. Further, if the VNTC is lower than the monitoring temperature $T_{monitor\_start\_high}$, e.g., 40° C., but higher than the low monitoring temperature $T_{monitor\_start\_low}$, e.g., 10° C., it is indicated that the monitoring starts by relatively a long period of 10 s.

Figure 16:
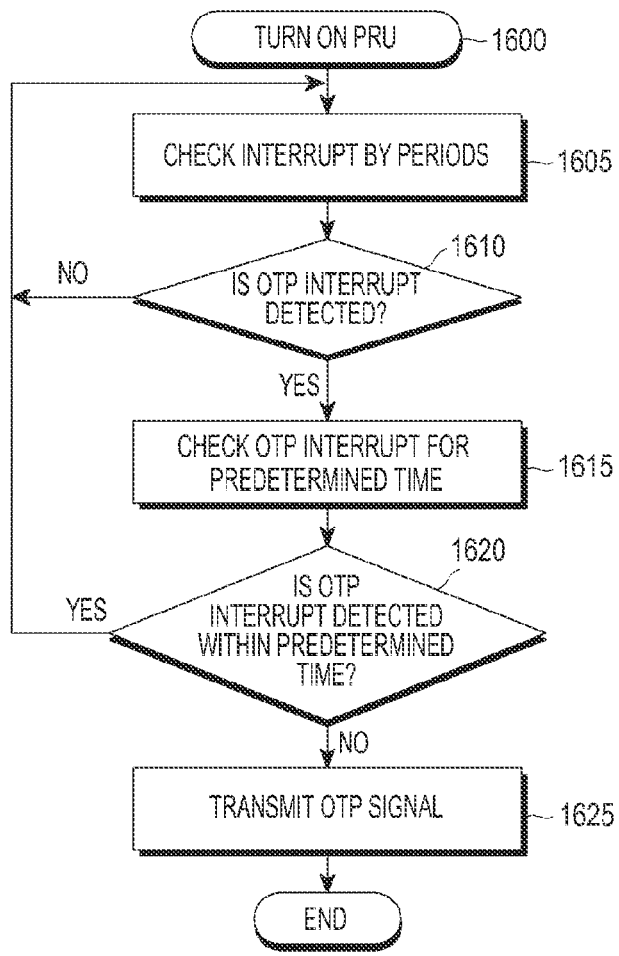
FIG. 16 is a flowchart illustrating a process of controlling over-temperature by using an interrupter, according to another embodiment of the present invention, when a wireless PRU is overheated.

FIG. 16 is a flowchart illustrating a process of controlling over-temperature by using an interrupter according to another embodiment of the present invention, when the wireless PRU 250 is overheated.

Referring to FIG. 16, in the state in which the wireless PRU 250 is turned on at step 1600, the interrupt is checked by periods at step 1605 and it is determined whether an OTP interrupt is detected at step 1610. If it is determined that the OTP is detected, an over-temperature recovery (OTR) interrupt is checked for a predetermined time, e.g., one minute, at step 1615. That is, it is determined whether the OTR interrupt occurs in which the wireless PRU 250 is heated over a certain temperature and then recovered to a normal state again. If it is determined that the OTP interrupt is not detected, it is returned to step 1605. If the OTR interrupt is not detected within a predetermined term, e.g., one minute, at step 1620, the wireless PRU 250 transmits the OTP signal to the wireless PTU 200 because it is determined that the wireless PRU 250 is not recovered to the normal state, in step 1625. On the other hand, if the OTR interrupt is detected at step 1620, it is regarded that the wireless PRU 250 is recovered to the normal state, and it is returned to step 1605. The operation of the wireless PTU 200 in response to the reception of the OTP signal is identical to that of FIG. 13.

The operation of the wireless PRU 250 which acts as an OTP trigger by using the OTP interrupt of FIG. 16 is indicated in Table 7 below.

TABLE 7

| PRU Power IC | PRU Comm. IC + MCU | PTU |
|---|---|---|
| OTP1 | Turn off Load SW | Set Itx = 0 mA and |
| OTP2 | Send OTP message to PTU if OTR message is not displayed within one minute | Latch fault mode<br>(if OTP message is received) |
| NTCU<br>NTCL | Frequently monitor Temp<br>(every 1 s) | |

On the other hand, the operation of the wireless PRU 250 which performs an OTP recovery by using the OTP interrupt of FIG. 16 is indicated in Table 8 below.

TABLE 8

| PRU Power IC | PRU Comm. IC + MCU | PTU |
|---|---|---|
| OTR1<br>OTR2 | Turn on Load SW | |

Figure 17:
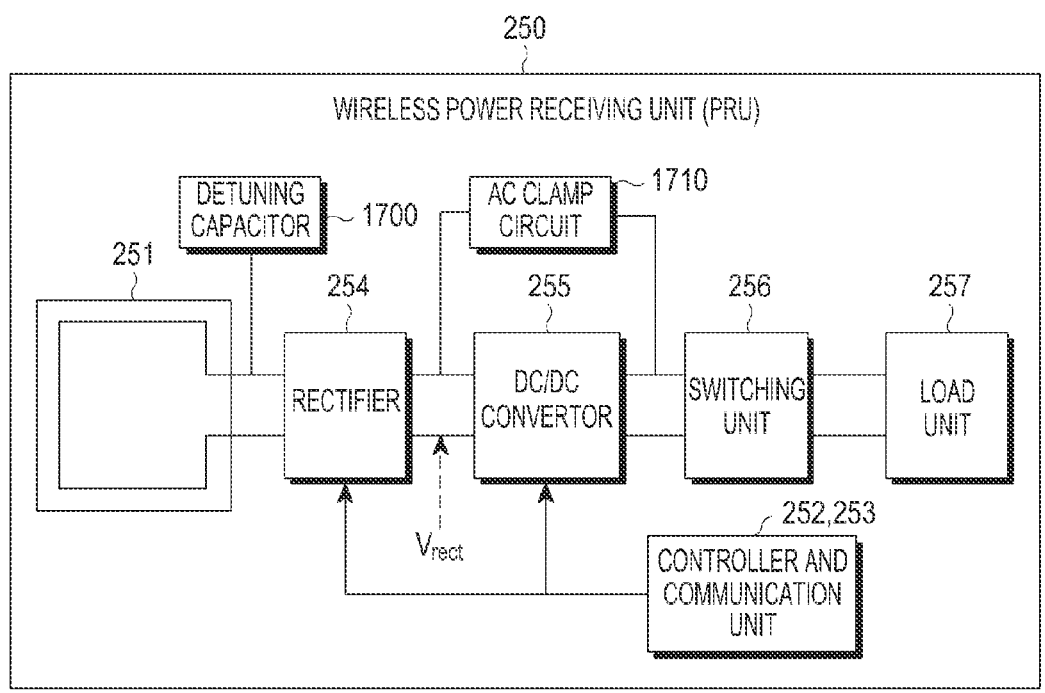
FIG. 17 is a block diagram illustrating a detail of a wireless PRU, according to a second embodiment of the present invention.

FIG. 17 is a block diagram illustrating a detail of the wireless PRU 250, according to the second embodiment of the present invention.

The wireless PRU 250 shown in FIG. 17 further includes a detuning capacitor 1700 and an AC clamp circuit 1710. Herein, the detuning capacitor 1700 is implemented in the form of a capacitor interposed between the power receiver 251 and the rectifier 254, and the AC clamp circuit 1710 is implemented in the form of a resistance element. There is a difference only in the above-mentioned structure, and thus the description of the wireless PRU 250 will be omitted.

Figure 18:
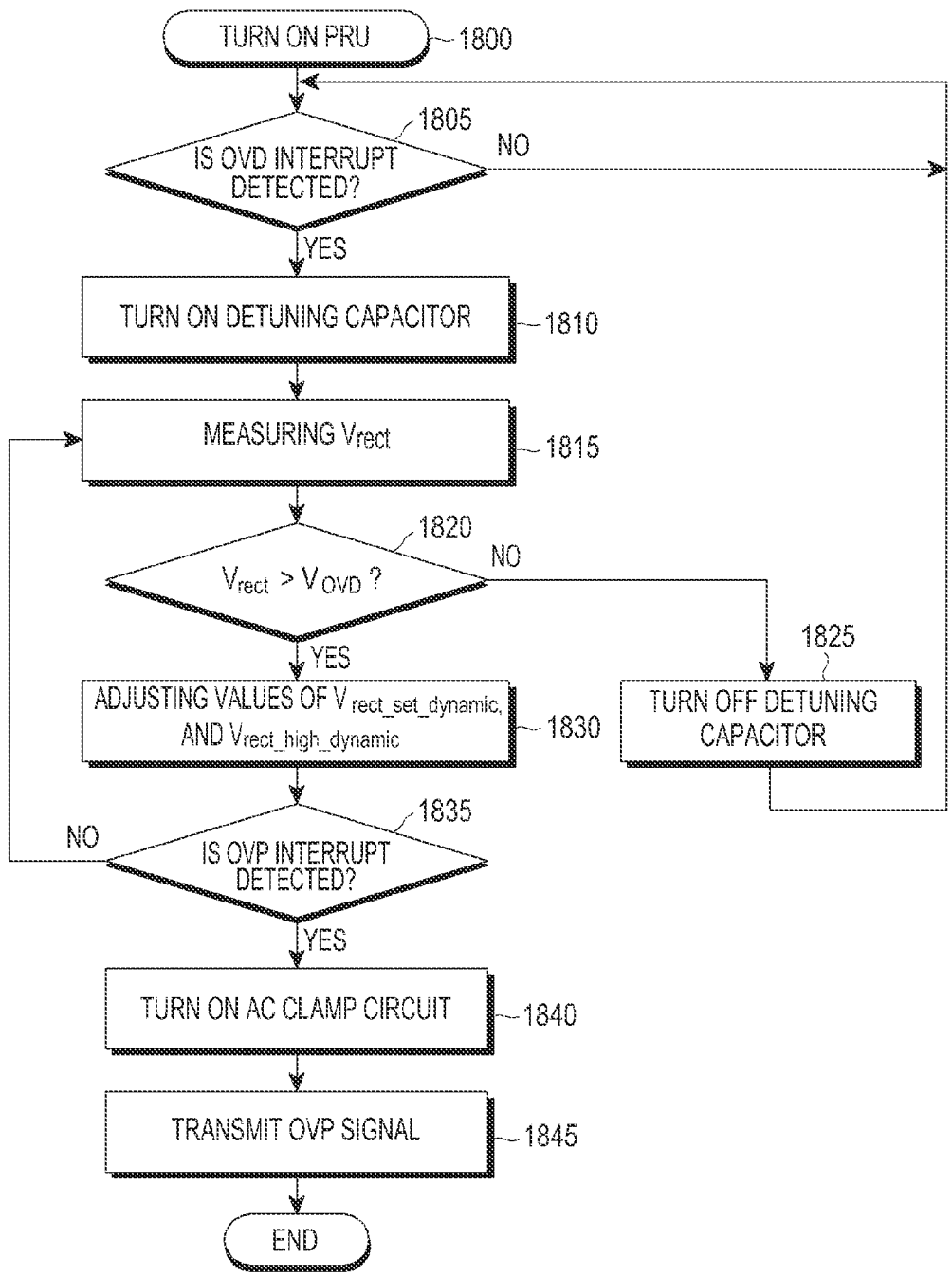
FIG. 18 is a flowchart illustrating a process of controlling an overvoltage, according to a second embodiment of the present invention, when a wireless PRU is subjected to the overvoltage.

The operation of the wireless PRU 250 shown in FIG. 17 will be described with reference to FIG. 18. FIG. 18 is a flowchart illustrating a process of controlling an overvoltage, according to the second embodiment of the present invention, when a wireless PRU is subjected to the overvoltage.

Referring to FIG. 18, the wireless PRU 250 is turned on at step 1800, and it is determined whether an overvoltage detuning (OVD) interrupt is detected, at step 1805. If it is determined that the OVD interrupt is detected, the detuning capacitor 1700 is turned on at step 1810. When the detuning capacitor 1700 is turned on, a resonance frequency is changed to decrease the charging efficiency, resulting in the reduction of the transmitted power. Next, a voltage $V_{rect}$ input to the DC/DC converter 255 is measured at step 1815, and then it is determined whether the measured voltage Vrect is higher than a predetermined overvoltage $V_{OVD}$ at step 1820. If it is determined that the measured voltage $V_{rect}$ is not higher than the predetermined overvoltage $V_{OVD}$, i.e., the measured voltage $V_{rect}$ is lower than the predetermined overvoltage $V_{OVD}$, it is regarded that the wireless PRU 250 is recovered to the normal state and the detuning capacitor 1700 is turned off at step 1825.

If it is determined that the measured voltage $V_{rect}$ is higher than the predetermine overvoltage $V_{OVD}$, values of $V_{rect\_set\_dynamic}$ and $V_{rect\_high\_dynamic}$ are adjusted at step 1830. Next, at step 1835, it is determined whether the OVP interrupt is detected. When the OVP interrupt is detected, the AC clamp circuit 1710 is turned on at step 1840. By turning on the AC clamp circuit 1710, the wireless PRU 250 may take prompt measures on the overvoltage by itself. Then, the wireless PRU 250 transmits the OVP signal to the wireless PTU

200 at step 1845. That is, the wireless PRU 250 notifies the wireless PTU 200 of the current status thereof, and then enables the wireless PTU 200 to interrupt the transmission of the electric power. The operation of the wireless PTU 200 in response to the reception of the OTP signal is identical to that of FIG. 13.

Figure 19:
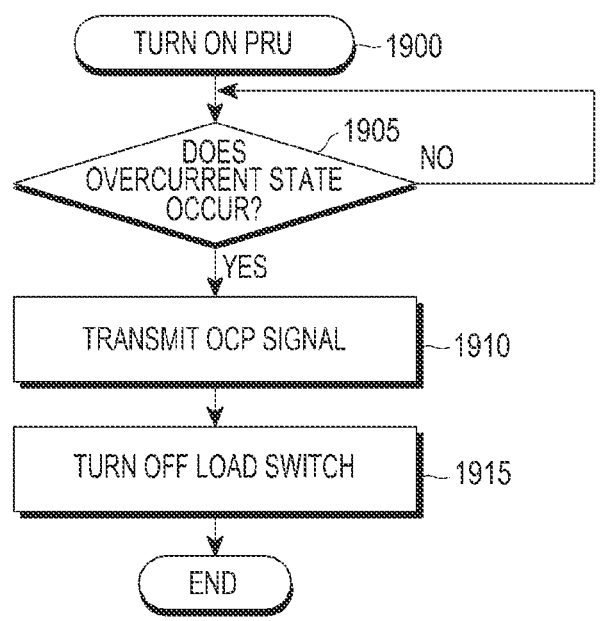
FIG. 19 is a flowchart illustrating a process of controlling an overcurrent, according to a third embodiment of the present invention, when a wireless PRU is subjected to the overcurrent.

FIG. 19 is a flowchart illustrating a process of controlling an overcurrent, according to the third embodiment of the present invention, when a wireless PRU 250 is subjected to the overcurrent.

Referring to FIG. 19, the wireless PRU 250 determines whether an overcurrent is present at step 1905 when being turned on in step 1900. If the overcurrent is present, the wireless PRU 250 transmits the overcurrent protection (OCP) signal to the wireless power transmitting 200 at step 1910. Then, the load switch is turned off at step 1915. At this time, the wireless PRU 250 transmits the state of the load switch to the wireless PTU 200.

The operation of the wireless PRU 250 caused by the overcurrent may be indicated in Tables 9 and 10 below.

TABLE 9

| PRU Power IC | PRU Comm. IC + MCU | PTU |
| --- | --- | --- |
| Idcout >1.12A | Load sw off<br>Send OCP message to PTU | Set Itx = 0 mA and<br>Latch fault mode |

TABLE 10

| PRU Power IC | PRU Comm. IC + MCU | PTU |
| --- | --- | --- |
| IDC interrupt | Turn off Load SW<br>Send OCP message to PTU | Set Itx = 0 mA and<br>Latch fault mode |

Figure 20:
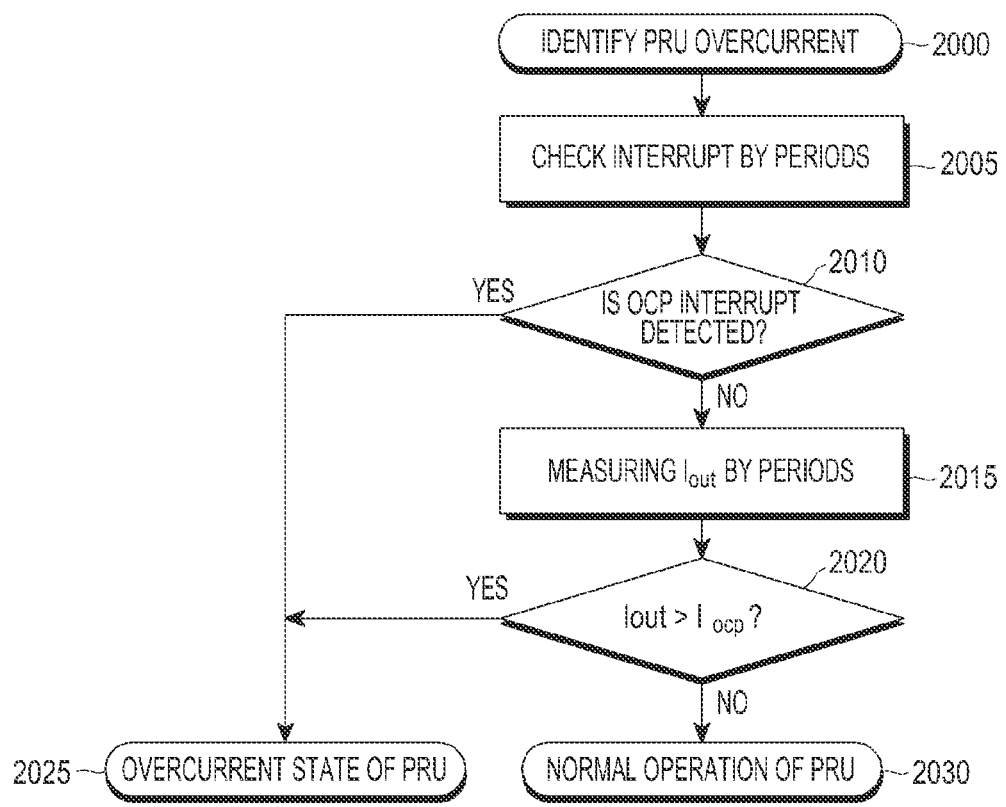
FIG. 20 is a flowchart illustrating the process of controlling the overcurrent in the wireless PRU of FIG. 19, in which the process is shown in detail.

The operation of the wireless PRU 250 caused by the overcurrent will be described in detail with reference to FIG. 20. Referring to FIG. 20, the overcurrent is identified at step 2000, and the interrupt is checked by periods in step 2005. At this time, the PMIC 1153 subjectively performs the period check of the interrupt, and notifies the AP 1152 of an occurrence of the interrupt when the interrupt occurs, thereby performing the check of the interrupt. It is determined through the check of the interrupt whether the OCP interrupt is detected at step 2010. If it is determined that the OCP interrupt is detected, it is regarded as the overcurrent state in step 2025 and an operation of transmitting the OCP signal is performed. If it is determined that the OCP interrupt is not detected, on the other hand, an electric current output from the DC/DC convertor 255 Iout is measured by periods at step 2015. The electric current output from the DC/DC convertor 255 is measured by the AP 1152. It is determined whether the output current Iout is larger than a predetermined overcurrent $I_{OCP}$ at step 2020. If the output current Iout is larger than the predetermined overcurrent $I_{OCP}$, it is determined that the overcurrent state occurs at step 2025. However, if the output current Iout is smaller than the predetermined overcurrent $I_{OCP}$, the wireless power receiver 250 normally operates because there is no overcurrent state in step 2030.

An operation algorithm of the present invention is now described.

1. A POWER IC is identified by reading an address 3F.
2. When electric power is applied to a Combo IC, i2c reads addresses 0A, 0B, 0C, 0D, 11 and 12 from the POWER IC at a time interval of 100 ms, and stores values of $V_{RECT}$, $I_{RECT}$, $V_{OUT}$, and $I_{OUT}$ in a GATT database (when the PTU reads the addresses 0A, 0B, 0C, 0D, 11 and 12, and stores values of $V_{RECT}$, $I_{RECT}$, $V_{OUT}$, and $I_{OUT}$ so that they are able to be transmitted).

If Iout is larger than 1.12 A, the DC-DC convertor is turned off and then the OCP signal is transmitted to the PTU.

3. When electric power is applied to the Combo IC, i2c reads addresses 0E and 13 from the POWER IC at a time interval of 10 s, and stores values of VNTC in the GATT database (when the PTU reads the addresses 0E and 13, and stores values of VNTC so that it is able to be transmitted).

For example, if the value of the VNTC, which is the measured temperature, is lower than 10° C. but higher than 45° C., the value of the VNTC is read at the time interval of is (a period by which the VNTC is read is shortened) and stored in the GATT database. Further, if the value of the VNTC is higher than 15° C. but lower than 40° C., the value of the VNTC is read at the time interval of 10 s (a period by which the VNTC is read is extended) and stored in the GATT database. Further, it is necessary to adjust $V_{rect\_min\_dynamic}$, $V_{rect\_high\_dynamic}$, and $V_{rect\_set\_dynamic}$ according to the value of the VNTC.

Meanwhile, if the value of the VNTC is lower than 5° C. or higher than 50° C., the load sw is turned off. If the value of the VNTC is lower than 0° C. or higher than 55° C., an OTP message is transmitted.

4. When a charge enable signal is received, 1 is written in 0 bit of an address 06, so as to turn on the DC-DC convertor.

5. When the interrupt occurs, a status register (addresses 00 and 01) is read.

5-1) If OTP1 and OTP2 occur, the load switch is turned off. Then, if OTR1 and OTR2 do not occur within one minute, an OTP message is transmitted to the PTU.

5-2) When the OTR1 and OTR2 occur, the load switch is turned on.

If NTCU and NTCL occur, the period by which the value of the VNTC is read is shortened to 1 s and the value of the VNTC is continuously read.

When the IDC occurs, the OCP message is transmitted to the PTU.

When a TAH occurs, the load switch is turned off and a TA detection message is transmitted to the PTU.

With relation to a BOD and a WDT, a separate operation is unnecessary.

When the OVD occurs, the values of the $V_{rect\_high\_dynamic}$ and $V_{rect\_set\_dynamic}$ are lowered.

The OVP does not turn off the load switch and transmits an OVP message to the PTU.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for controlling an abnormal condition of a wireless Power Receiving Unit (PRU), the method comprising:
    measuring a temperature of the wireless PRU by a period shorter than a previous measurement period when a temperature measured by the wireless PRU in response to a transmission of power from a wireless Power Transmitting Unit (PTU) is higher than a temperature required to be monitored;
    determining whether the measured temperature is higher than a temperature at which a load switch connected to a charging unit is turned off if the measured temperature is equal to or higher than the temperature required to be monitored; and turning off the load switch if the measured temperature is higher than the temperature at which the load switch is turned off.

2. The method as claimed in claim 1, further comprising:
determining whether the measured temperature is higher than a predetermined over-temperature, after the load switch is turned off; and notifying wireless PTU of an over-temperature state so that the wireless PTU interrupts the transmission of the power, if it is determined that the measured temperature is higher than the predetermined over-temperature.

3. The method as claimed in claim 1, further comprising:
notifying of a status of the load switch after the load switch is turned off.

4. The method as claimed in claim 3, wherein the load switch status is transmitted to the wireless PTU by using a PRU dynamic signal.

5. The method as claimed in claim 1, further comprising:
turning on the load switch if the measured temperature is lower than a temperature at which the load switch must be turned off after the load switch is turned off.

6. The method as claimed in claim 2, further comprising:
determining whether an over-temperature recovery (OTR) interrupt occurs for a predetermined time if the measured temperature is higher than the predetermined over-temperature.

7. The method as claimed in claim 6, further comprising:
turning on the load switch if the OTR interrupt occurs within the predetermined time.

8. The method as claimed in claim 6, wherein the notifying of the over-temperature state to the wireless PTU includes notifying the wireless PTU of an over-temperature if the OTR interrupt does not occur within the predetermined time.

9. The method as claimed in claim 1, further comprising:
determining whether an Negative Temperature Coefficient High (NTCH) interrupt occurs; and measuring a temperature by a period shorter than the previous measurement period when the NTCH interrupt occurs.

10. The method as claimed in claim 1, further comprising:
turning on a detuning capacitor if a voltage measured in the wireless PTU corresponds to a power transmission from the wireless PTU;

determining whether the measured voltage is higher than a predetermined overvoltage after the detuning capacitor is turned off; and turning off the detuning capacitor if the measured voltage is lower than the predetermined overvoltage.

11. The method as claimed in claim 10, further comprising:
notifying a wireless PTU of an overvoltage state if it is determined that the measured temperature is higher than the predetermined overvoltage.

12. A wireless Power Receiving Unit (PRU) for controlling an abnormal state, the wireless PRU comprising:
a temperature measurement unit which measures a temperature of the wireless PRU corresponding to a power transmission from a wireless Power Transmitting Unit (PTU); and a controller which controls to measure a temperature by a period shorter than a previous measurement period if a measurement temperature is higher than a temperature required to be monitored, to determine whether the measured temperature is higher than a temperature at which a load switch is turned off if the measured temperature is higher than a temperature required to be monitored, and to turn off the load switch if the measured temperature is higher than a temperature at which the load switch is turned off.

13. The wireless PRU as claimed in claim 12, wherein the controller controls to determine whether the measured temperature is higher than a predetermined over-temperature after the load switch is turned off, and to notify the wireless PTU of an over-temperature state so that the wireless PTU interrupts the power transmission if the measured temperature is higher than the predetermined over-temperature.

14. The wireless PRU as claimed in claim 13, further comprising:
a communication unit which transmits a signal notifying of the over-temperature state.

15. The wireless PRU as claimed in claim 13, wherein the controller transmits a signal notifying of a state of the load switch through the communication unit after the load switch is turned off.

16. The wireless PRU as claimed in claim 15, wherein the state of the load switch is transmitted to the wireless PTU by using a PRU dynamic signal.

17. The wireless PRU as claimed in claim 12, wherein the controller turns on the load switch if the measured temperature is lower than a temperature at which the load switch must be turned off after the load switch is turned off.

18. The wireless PRU as claimed in claim 12, wherein the controller determines whether an overtemperature recovery (OTR) interrupt occurs for a predetermined time if the measured temperature is higher than the predetermined over-temperature.

19. The wireless PRU as claimed in claim 12, wherein the temperature measuring unit measures a temperature of an output terminal of a rectifier or a temperature of a battery of the PRU.

* * * * *